(12) United States Patent
Terasaki et al.

(10) Patent No.: US 11,004,572 B2
(45) Date of Patent: May 11, 2021

(54) CHARGED PARTICLE DETECTION MATERIAL, AND CHARGED PARTICLE DETECTION FILM AND CHARGED PARTICLE DETECTION LIQUID USING THE SAME

(71) Applicant: NATIONAL INSTITUTE OF ADVANCED INDUSTRIAL SCIENCE AND TECHNOLOGY, Tokyo (JP)

(72) Inventors: Nao Terasaki, Tosu (JP); Kazuya Kikunaga, Tosu (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 59 days.

(21) Appl. No.: 16/318,545

(22) PCT Filed: Jul. 20, 2017

(86) PCT No.: PCT/JP2017/026373
§ 371 (c)(1),
(2) Date: Jan. 17, 2019

(87) PCT Pub. No.: WO2018/021160
PCT Pub. Date: Feb. 1, 2018

(65) Prior Publication Data
US 2019/0241803 A1    Aug. 8, 2019

(30) Foreign Application Priority Data
Jul. 29, 2016   (JP) .............................. JP2016-149215

(51) Int. Cl.
*C09K 9/00*      (2006.01)
*C09K 11/00*    (2006.01)
(Continued)

(52) U.S. Cl.
CPC .................. *G21K 4/00* (2013.01); *C09K 9/00* (2013.01); *C09K 11/00* (2013.01); *C09K 11/64* (2013.01);
(Continued)

(58) Field of Classification Search
CPC .......... C09K 9/00; C09K 11/00; C09K 11/64; C09K 11/70; G21K 4/00; G21K 2004/06; G01T 1/20
(Continued)

(56) References Cited

U.S. PATENT DOCUMENTS 7,175,086 B2 *   2/2007   Gascoyne ............ G01N 21/643
                                                              235/454
7,227,158 B1 *   6/2007   Patel .......................... G01T 1/04
                                                              250/484.5
(Continued)

FOREIGN PATENT DOCUMENTS

| CN | 1443827 A | 9/2003 |
|---|---|---|
| JP | 63-047688 A | 2/1988 |
| JP | 2011-132429 A | 7/2011 |

OTHER PUBLICATIONS

Virginija Vitola et al., "The search for defects in undoped SrAl2O4 material," Optical Materials 87 (2009), 48-52.*
(Continued)

*Primary Examiner* — Allen C. Ho
(74) *Attorney, Agent, or Firm* — Kratz, Quintos & Hanson, LLP

(57) ABSTRACT

A charged particle detection material which can detect charged particles due to a discharge phenomenon or the like caused even in a very low voltage which cannot be observed by a prior art, as well as a charged particle detection film and a charged particle detection liquid using the material. The charged particle detection material and the charged particle
(Continued)

detection film contain at least one of a fluorescent substance, a luminescent substance, an electroluminescent substance, a fractoluminescent substance, a photochromic substance, an afterglow substance, a photostimulated luminescent substance and a mechanoluminescent substance and can easily detect emission or incidence of charged particles in real time.

15 Claims, 23 Drawing Sheets

(51) Int. Cl.
| | |
|---|---|
| *C09K 11/64* | (2006.01) |
| *C09K 11/70* | (2006.01) |
| *G21K 4/00* | (2006.01) |
| *G01T 1/20* | (2006.01) |

(52) U.S. Cl.
CPC ............... *C09K 11/70* (2013.01); *G01T 1/20* (2013.01); *G21K 2004/06* (2013.01)

(58) Field of Classification Search
USPC .............................. 250/483.1, 484.2, 486.1
See application file for complete search history.

(56) References Cited

U.S. PATENT DOCUMENTS

| | | | | |
|---|---|---|---|---|
| 7,344,895 B2* | 3/2008 | Köhler | ................. | C07F 9/4009 436/523 |
| 7,525,127 B2* | 4/2009 | Hattori | ................. | H01L 33/507 257/100 |
| 7,713,624 B2* | 5/2010 | Meyer | ................. | C09K 11/02 252/301.4 H |
| 8,491,816 B2* | 7/2013 | Hong | ................. | G02B 6/0023 252/301.4 H |
| 8,841,635 B2* | 9/2014 | Bergeron | ............. | C09K 11/574 250/483.1 |
| 9,386,639 B2* | 7/2016 | Li | ........................... | H05B 45/46 |
| 9,395,308 B2* | 7/2016 | Yun | ........................ | G01N 21/91 |
| 9,772,069 B2* | 9/2017 | Jeong | ........................ | F21K 2/00 |
| 9,777,213 B2* | 10/2017 | Hong | ...................... | C09K 11/64 |
| 9,964,493 B2* | 5/2018 | Yun | ........................ | C09K 11/02 |
| 10,315,178 B2* | 6/2019 | Schotten | .................. | B01J 13/02 |
| 2006/0231781 A1 | 10/2006 | Takahashi | | |

OTHER PUBLICATIONS

Rocio Estefania Rojas-Hernandez, "Long lasting phosphors: SrAl2O4: Eu, Dy as the most studied material," Renewable and Sustainable Energy Reviews 81 (2018), 2759-2770.*

F. Clabau et al. "Mechanism of Phosphorescence Appropriate for the Long-Lasting Phosphors Eu2+-doped SrAl2O4 with Codopents Dy3+ and B3+," Chem. Mater. 17 (2005), 17, 3904-3912.*

M. Kowatari, et al.; "The Luminescence from a Long Lasting Phosphor Exposed to Alpha, Beta, and Gamma Rays"; Journal of Nuclear Science and Technology; vol. 39; No. 12; 2002; pp. 1251-1259 (9 pages, 1 cover page, 10 pages total).

P. Jha, et al.; "Pulse-induced mechanoluminescence of ultraviolet-irradiated SrAl2O4:Eu,Dy phosphors"; Radiation Effects and Defects in Solids; vol. 169; No. 8; 2014; pp. 655-668 (14 pages, 1 cover page, 15 pages total).

V. Abbruscato; "Optical and Electrical Properties of SrAl2O4: Eu2+"; Journal of the Electrochemical Society; vol. 118; No. 6; 1971; pp. 930-933 (4 pages).

S. Parl, et al.; "Melilite-Structure CaYAl3O7:Eu3+ Phosphor: Structural and Optical Characteristics for Near-UV LED-Based White Light"; The Journal of Physical Chemistry; vol. 116; 2012; pp. 26850-26856 (7 pages).

M. Kowatari, et al.; "The temperature dependence of luminescence from a long-lasting phosphor exposed to ionizing radiation"; Nuclear Instruments and Methods in Physics Research Section A; vol. 480; 2002; pp. 431-439 (9 pages).

N.J. Zuniga-Rivera, et al.; "Persistent luminescence, TL and OSL characterization of beta irradiated SrAl2O4:Eu2+, Dy3+ combustion synthesized phosphor"; Nuclear Instruments and Methods in Physics Research B; vol. 326; 2014; pp. 99-102 (4 pages).

* cited by examiner

CHARGED PARTICLE DETECTION MATERIAL, AND CHARGED PARTICLE DETECTION FILM AND CHARGED PARTICLE DETECTION LIQUID USING THE SAME

TECHNICAL FIELD

The present invention relates to a charged particle detection material which can easily detect emission or incidence of charged particles such as electrons and ions from or to a member in real time, and a charged particle detection film and a charged particle detection liquid using the material.

BACKGROUND ART

Materials for detecting charged particles such as electrons and ions have been required in the technical fields widely ranging from theoretical physics to applied engineering.

Examples of such a material for detecting charged particles include a fluorescent material such as cesium iodide used as a scintillator, and a semiconductor such as silicon or germanium used for a semiconductor charged particle detector (see Patent Document 1).

In addition, other examples of the material include a fluorescent material such as (Zn, Cd)S:Ag used in a fluorescent screen used for reflection high-energy electron diffraction (RHEED) and low-energy electron diffraction (LEED).

PRIOR ART DOCUMENTS

Patent Documents

Patent Document 1: Japanese Patent Application Laid-Open No. 2010-67738

SUMMARY OF INVENTION

Problem to be Solved

However, these charged particle detection materials have such a problem that charged particles cannot be easily detected, e.g. measuring equipment other than the charged particle detection material is required for detecting charged particles. In addition, fluorescent materials used as scintillators, semiconductors used for semiconductor charged particle detectors, and fluorescent materials used for RHEED have such a problem that only charged particles having high energy (100 eV or higher) can be detected. Furthermore, fluorescent materials used for RHEED and LEED have such a problem that it can be used only under a condition of a high degree of vacuum (lower than $10^{-4}$ Torr) for obtaining a diffraction pattern on a sample surface.

Solution to Problem

As a result of continuous studies on static electricity, the inventor of the present invention observed that charged particles were emitted from a surface of a member negatively charged at a low voltage (potential difference) in the atmosphere and entered a surface of another member, and for the first time in the world, the inventor discovered a phenomenon that even if a very weak electric field (1 k/mm or lower) was applied with a gap of 35 mm (distance) in the atmosphere for example, the member emitted light in response to a trace amount of emitted charged particles.

As described in detail later, a charged particle detection material according to the present invention is applied on a charged particle-emitting part and a surface of the charged particle-emitting part, so that light is emitted from the surface of the charged particle-emitting part which are emitting charged particles, and at the same time, light is emitted also from a surface of a charged particle incident part which the charged particles enter. Thus, the charged particles can be detected in real time by observing these lights. Note that it has been conventionally considered that an aerial discharge phenomenon (spark discharge, corona discharge, glow discharge, arc discharge, etc.) can be caused in air only by applying an electric field on the order of about 1 to 3 kV/mm. In addition, a discharge caused by an electric field much weaker than the above-mentioned electric field is called a dark discharge, and a very weak current due to electrolytic dissociation of gaseous molecules by cosmic rays, radiations resulting from natural radioactivity, and the like is called a dark current. Although the dark discharge/dark current may be generated due to static electricity, they could not have been detected visually or by means of a camera or the like because they are not associated with a luminous phenomenon.

Furthermore, the positions of the dark discharge/dark current resulting from static electricity can be grasped to a certain extent by detecting electromagnetic waves resulting from the dark discharge/dark current. However, the positions could not have been observed due to influence of noises or the like at a manufacturing site where noises are always generated, at a place where a plurality of electrostatic discharges are generated, in a case where an energy of electrostatic discharge is low, or the like.

The discharge phenomenon in such a complicated environment could not have been observed by a conventional observation method known so far, but could be observed only by the present invention. Then, the present inventor named this phenomenon resulting from static electricity was named as static electrical luminescence (SEL).

As described above, an object of the present invention is to provide a charged particle detection material which can detect charged particles due to a discharge phenomenon or the like caused even in a very weak electric field (low potential difference) which cannot be observed by a prior art, as well as a charged particle detection film and a charged particle detection liquid using the material.

A first aspect of the present invention for solving the above-described problems consists in a charged particle detection material for detecting emission of charged particles from a charged particle-emitting part or incidence of the charged particles to a charged particle incident part, which characteristically contains at least one of a luminescent substance, an electroluminescent substance, a fractoluminescent substance, a photochromic substance, an afterglow substance, a photostimulated luminescent substance and a mechanoluminescent substance.

Herein, the term "charged particles" refers to particles, clusters, gases and the like carrying an electrical charge. Examples of the charged particles include electrons, protons, ionized atoms (including atomic nucleus itself), ionized molecules (including complexes), electrolytically-dissociated/ionized gases and the like.

In addition, the term "luminescent substance" refers to a luminescent substance other than a fluorescent substance described later, which is a substance capable of emitting light by X-ray, ultraviolet ray, visible light or the like, and a substance capable of emitting light by chemical change or biological enzymes. Specific examples of the luminescent substance include: phosphorescent luminescent materials such as iridium complexes (typified by tris (2-phenylpyridinate) iridium (III)) and platinum complexes; chemiluminescent substances typified by luminol, rofin, lucigenin and oxalate; photosensitive luminescent dye such as 9,10-diphenylanthracene, 9,10-bis (phenylethynyl) anthracene, tetracene, 1-chloro-9,10-bis (phenylethynyl) anthracene, 5,12-bis (phenylethynyl) naphthacene, rubrene, Rhodamine 6G and Rhodamine B; bioluminescent substances typified by luminol; and the like.

The term "electroluminescent substance" refers to a substance that emits light by applying an electric field. Specific examples of the electroluminescent substance include: a low molecular weight substances such as tris (8-quinolinolato) aluminum complex (Alq), bis (benzoquinolinolato) beryllium complex (BeBq), tri (dibenzoylmethyl) phenanthroline europium complex (Eu (DBM) 3 (Phen)), ditoluylvinylbiphenyl (DTVBi) and rubene; π-conjugated polymer substances such as poly (p-phenylenevinylene) and polyalkylthiophene; and the like.

The term "fractoluminescent substance" refers to a substance that emits light in association with breakage due to mechanical stimulation such as destruction and friction. Specific examples of the fractoluminescent substance include: an inorganic material such as dolomite, muscovite, quartz, trilithionite, pectolite, fluorite and polylithionite; an organic material such as an Eu (TTA) 3 type, a carbazole derivative, an anthranilic acid type and a sugar; and the like.

The term "photochromic substance" refers to a substance which shows change in physical characteristics such as color by irradiation with X-ray, ultraviolet ray or visible ray. Specific examples of the photochromic substance include: an organic pigment typified by a spiropyran type, a diarylethene type and a fulgide type, an inorganic material typified by barium magnesium silicate ($BaMgSiO_4$); and the like.

The term "afterglow substance" refers to a substance which accumulates lights (electromagnetic waves) of visible ray, ultraviolet ray and the like with which the substance is irradiated, and emits the lights even when the irradiation is stopped. Specific examples of the afterglow substance include a radium compound, a promethium compound, a zinc sulfide (ZnS type), a strontium aluminate ($SrAl_2O_4$ type) and the like, and a zinc sulfide (ZnS type) and a strontium aluminate ($SrAl_2O_4$ type) to which monovalent to trivalent metal ions such as Dy and Eu are added in an arbitrary proportion are preferable. Herein, the term "add" refers to a concept that includes "co-doping", which means simultaneous addition of two or more substances, and "activation".

The term "photostimulated luminescent substance" refers to a substance which emits light by excitation of visible or infrared ray after irradiation with a high-energy laser, radiation or the like. Specific examples of the photostimulated luminescent substance include $BaFX:Eu^{2+}$ (X represents Br or I) and the like.

The term "mechanoluminescent substance" refers to a substance which emits light (including visible ray, ultraviolet ray, near-infrared ray) through deformation caused by a mechanical external force. Examples of the mechanoluminescent substance include: a substance mainly composed of an oxide, a sulfate, a selenide or a telluride which has a spinel structure, a corundum structure, a β-alumina structure, a silicate, a defect-controlling aluminate and a structure with coexistence of a wurtzite type structure and a sphalerite type structure, and the like; and a substance in which at least a part of alkali metal ions and alkali earth metal ions constituting the above-described structure is substituted by at least one metal ion of rare earth metal ions and transition metal ions; and the like.

The mechanoluminescent substances are classified into an alumina type, a silica type, a phosphoric acid type, a titanium oxide type, a zinc sulfide type and others.

Specific examples of the alumina type include: $xSrO \cdot yAl_2O_3 \cdot zMO$ (M represents a divalent metal Mg, Ca or Ba; each of x, y and z represents an integer. Note that M is not limited as long as it is a divalent metal, but Mg, Ca and Ba are preferable. In addition, x, y and z represents an integer equal to or larger than 1.); $Al_2O_3:Tb^{3+}$; $SrAl_2O_4:M$ (doped with M=at least one of $Eu^{2+}$, $Dy^{3+}$, $Ce^{3+}$ and $Ho^{3+}$); $ZnAl_2O_4:M$ (doped with M=at least one of $Eu^{2+}$, $Mn^{2+}$, $Dy^{3+}$, $Ce^{3+}$ and $Ho^{3+}$); $SrAl_2O_4:Eu^{2+}$; $SrAl_2O_4:Ce^{3+}$; $SrAl_2O_4:Eu^{2+}$, $D^{3+}$; $SrAl_2O_4:Eu^{2+}$, $Ho^{3+}$; $SrAl_2O_4:Ho^{3+}$, $Ce^{3+}$; $XAl_2O_4:M$ (doped with X=one or two of Sr, Ba, Mg, Ca and Zn, and doped with M=at least one of $Eu^{2+}$, $Dy^{3+}$, $Tb^{3+}$, $Ho^{3+}$); $SrAl_2O_4:Eu^{2+}$, $Cr^{3+}$, $Nd^{3+}$; and the like.

Other specific examples of the alumina type include: general formula $Sr\{1-(2x+3y+3z)/2\}Al_2O_4:xEu^{2+}$, $yCr^{3+}$, $zNd^{3+}$ (here, each of x, y and z represents 0.25 to 10 mol %, preferably 0.5 to 2 mol %); $Sr_3Al_2O_6:Eu^{2+}$; $CaYAl_3O_7:Eu^{2+}$; $CaYAl_3O_7:M$ (doped with M=at least one of $Eu^{2+}$, $Ce^{3+}$, $Dy^{3+}$, $Ce^{3+}$ and $Ho^{3+}$) $SrMgAl_{10}O_{17}:Ce^{3+}$; and the like.

Specific examples of the silica type include: $xSrO \cdot yAl_2O_3 \cdot zSiO_2$ (each of x, y and z represents an integer); $Ca_2Al_2Si_2O_7:Ce^{3+}$; $X_2Al_2SiO_7:M$ (doped with X=one of Ca and Sr, and doped with M=at least one of $Eu^{2+}$, $Eu^{3+}$, $Ce^{3+}$ and $Dy^{3+}$); $Ca_2MgSi_2O_7$; $Ce^{3+}$; $XMgSi_2O_7:M$ (doped with X=one of $Ba_2$, $Ca_2$ and $Sr_2$ or X=one of SrCa and SrBa, and doped with M=at least one of $Eu^{2+}$, $Dy^{3+}$ and $Ce^{3+}$); $CaAl_2Si_2O_8:Eu^{2+}$, $SrCaAl_2Si_2O_8:Eu^{2+}$; $Ca_3Y_2Si_3O_{12}:RE^{3+}$ (doped with $RE^{3+}$=at least one of $Dy^{3+}$ and $Eu^{2+}$); $BaSi_2O_2N_2:Eu^{2+}$; and the like.

Specific examples of the phosphoric acid type include: $Li_3PO_4:RE$ (RE=$Dy^{3+}$, $Tb^{3+}$, $Ce^{3+}$ or $Eu^{2+}$); $LiXPO_4:Eu^{2+}$ (X=one of Sr and Br); $Li_2BaP_2O_7:Eu^{2+}$; $CaZr(PO_4)_2:Eu^{2+}$; and the like.

Specific examples of the titanium oxide type include: $CaTiO_3:Pr^{3+}$; $BaCaTiO_3:Pr^{3+}$; $BaTiO_3$—$CaTiO_3:P^{3+}$; and the like.

Specific examples of the zinc sulfide type include: ZnS:M (M is not limited as long as it is bivalent metal, but is preferably Mn, Ga, Cu or the like; doped with M=at least one of $Mn^{2+}$, $Ga^{2+}$, $Te^{2+}$, $Cu^{2+}$, CuCl, Al); XZnOS:M (doped with X=one of Ca and Ba, and M=one of $Mn^{2+}$ and $Cu^{2+}$); ZnMnTe; and the like.

Other specific examples of mechanoluminescent substance include: $CaZrO_3:Eu^{3+}$; $CaNb_2O_n:Pr^{3+}$ (n=6 or 7); (Sr, Ca, Ba)(2)$SnO_4:Sm^{3+}$, $La^{3+}$; $Sr_{n+1}Sn_nO_{3n+1}:Sm^{3+}$ (n=1, 2 or more); $Y_2O_3:Eu^{2+}$; $ZrO_2:Ti$; $XGa_2O_4:Mn^{2+}$ (X=either one of Zr and Mg); and the like.

In the first aspect, emission of the charged particles from the charged particle-emitting part or incidence of the charged particles to the charged particle incident part can be easily detected in real time.

A second aspect of the present invention consists in a charged particle detection material for detecting emission of charged particles from a charged particle-emitting part or incidence of the charged particles to a charged particle incident part in a non-vacuum state, which characteristically contains at least one of a fluorescent substance, a luminescent substance, an electroluminescent substance, a fractoluminescent substance, a photochromic substance, an afterglow substance, a photostimulated luminescent substance and a mechanoluminescent substance.

Herein, the term "non-vacuum" refers to a state under a pressure of $10^{-4}$ Torr or more. The charged particle detection material according to the present invention is used in a pressure range of preferably $10^{-3}$ to $10^5$ Torr, more preferably $10^{-3}$ to $10^4$ Torr. Note that the gas molecules in the non-vacuum state are not particularly limited, and they may be an inert gas such as Ar, He and $N_2$, atmospheric air or the like.

The term "fluorescent substance" refers to a substance which emits light by absorbing energy such as X-ray, ultraviolet ray and visible ray with which the substance is irradiated. Examples of the fluorescent substance include: ZnS:Ag+(Zn, Cd)S:Ag; $Y_2O_2S$:Eu+$Fe_2O_3$; ZnS:Cu, Al; ZnS:Ag+$CoAl_2O_3$; $Zn_2SiO_4$:Mn; ZnS:Ag, Cl; ZnS:Zn; (KF, $MgF_2$):Mn; (Zn, Cd)S:Ag; (Zn, Cd)S:Cu; ZnO:Zn; (Zn, Cd)S:Cu; ZnS:Cu; ZnS:Cu, Ag; $MgF_2$:Mn; (Zn, Mg)$F_2$:Mn; $Zn_2SiO_4$:Mn; ZnS:Ag+(Zn, Cd)S:Cu; $Gd_2O_2S$:Tb; $Y_2O_2S$:Tb; $Y_2O_2S$:Tb; $Y_3AsO_2$:Ce; Y(Al, Ga)$_5O_{12}$:Ce; $Y_2SiO_5$:Ce; $Y_3Al_5O_{12}$:Tb; $Y_3$(Al, Ga)$_5O_{12}$:Tb; ZnS:Ag, Al; $InBO_3$:Tb; $InBO_3$:EU; ZnS:Ag; ZnS:Cu, Al; ZnS:Cu, Au, Al; $Y_2SiO_5$:Tb; (Zn, Cd)S:Cu; Cl+(Zn, Cd)S:Ag, CL; $InBO_3$:Tb+$InBO_3$:Eu; ZnS:Ag+ZnS:Cu+$Y_2O_2S$:Eu; $InBO_3$:Tb+$InBO_3$:Eu+ZnS:Ag; (Ba, Eu)$Mg_2Al_{16}O_{27}$; (Ce, Tb)$MgAl_{11}O_{19}$; $(Y,Eu)_2O_3$; (Sr, Eu, Ba, Cf)$_5$(PO$_4$)$_3$CL; (La, Ce, Tb)PO$_4$; $Y_2O_3$:Eu; LaPO$_4$:Ce, Tb; (Sr, Cf; Ba)$_{10}$(PO$_4$)$_6$CL$_2$:Eu; (La, Ce, Tb)PO$_4$:Ce, Tb; $Zn_2SiO_4$:Mn; $Zn_2SiO_4$:Mn; $Sb_2O_3$; $Ce_{0.67}Tb_{0.33}MgA_{11}O_{19}$:Ce, Tb; $Y_2O_3$:Eu(III); $Mg_4$(F)GeO$_6$:Mn; $Mg_4$(F)(Ge, Sn)O$_6$:Mn; CaWO$_4$; CaWO$_4$:Pb; (Ba, Ti)$_2P_2O_7$:Ti; $Sr_2P_2O_7$:Sn; $Cf_5F(PO_4)_3$:Sb; $Sr_5F(PO_4)_3$:Sb, Mn; BaMgAl$_{10}O_{17}$:Eu, Mn; BaMg$_2$Al$_{16}O_{27}$:Eu(II); BaMg$_2$Al$_{16}O_{27}$:Eu(II), Mn(II); $Sr_5Cl(PO_4)_3$:Eu(II); $Sr_6P_5BO_{20}$:Eu; (Cf, Zn, Mg)$_3$(PO$_4$)$_2$:Sn; (Sr, Mg)$_3$(PO$_4$)$_2$:Sn; CaSiO$_3$:Pb, Mn; $Cf_5F(PO_4)_3$:Sb, Mn; $Cf_5$(F, Cl)(PO$_4$)$_3$:Sb, Mn; (Cf, Sr, Ba)$_3$(PO$_4$)$_2$Cl$_2$:Eu; $3Sr_3(PO_4)_2SrF_2$:Sb, Mn; Y(P, V)O$_4$:Eu; (Zn, Sr)$_3$(PO$_4$)$_2$:Mn; $Y_2O_2S$:Eu; (Sr, Mg)$_3$(PO$_4$)$_2$:Sn(II); $3.5MgO_{0.5}MgF_2GeO_2$:Mn; $Cf_3(PO_4)_2CaF_2$:Ce, Mn; $SrAl_2O_7$:Pb; $BaSi_2O_5$:Pb; $SrFB_2O_3$:Eu(II); $SrB_4O_7$:Eu; $Gd_2O_2S$:Tb; $Gd_2O_2S$:Eu; $Gd_2O_2S$:Pr, $Gd_2O_2S$:Pr, Ce, F; $Y_2O_2S$:Tb; $Y_2O_2S$:Tb; $Y_2O_2S$:Tb; Zn(0.5)Cd(0.4)S:Ag; Zn(0.4)Cd(0.6)S:Ag; CdWO$_4$; CaWO$_4$; MgWO$_4$; $Y_2SiO_5$:Ce; YAlO$_3$:Ce; $Y_3Al_5O_{12}$:Ce; $Y_3$(Al, Ga)$_5O_{12}$:Ce; CdS; ZnO:Ga; ZnO:Zn; (Zn, Cd)S:Cu, Al; ZnO:Zn; (Zn, Cd)S:Cu, Al; ZnS:Cu, Al; ZnCdS:Ag; ZnS:Ag; $Zn_2SiO_4$:Mn; ZnS:Cu, Al; CsI:T; LiF/ZnS:Ag; LiF/ZnS:Cu, Al, Au; a fluorescein-type substance typified by fluorescein isothiocyanate; porphyrin; a porphyrin-based substance typified by platinum porphyrin; Rhodamine; azobenzene derivatives; an organic dye-type substance typified by anthracene; metal complex-type substance typified by ruthenium tris bipyridyl; poly (1, 4-phenylenevinylene); poly (1, 4-phenylene); a polyfluorene; luminescent polymer-type substance typified by poly(thiophene); other substances such as $Y_2O_2$:Eu; and the like.

In the second aspect, emission of the charged particles from the charged particle-emitting part or incidence of the charged particles to the charged particle incident part can be easily detected in real time even in a non-vacuum state.

The third aspect of the present invention consists in the charged particle detection material according to the first or second aspect, characterized in that the electric field between the charged particle-emitting part and the charged particle incident part is within a range of 1 to 3000 V/mm in air. Note that, in an environment other than air, the range of the electric field between the charged particle-emitting part and the charged particle incident part varies depending on their dielectric constants.

Herein, the term "in air" refers to a state at 700 to 800 Torr, humidity of 10 to 90% and temperature of 0 to 100° C. The charged particle detection material according to the present invention is preferably used under a condition of 720 to 780 Torr, humidity of 30 to 80% and temperature of 10 to 80° C.

In the third aspect, low-energy charged particles which have been unobservable by the conventional observation method can be easily detected in real time. Furthermore, the electric field is more preferably within a range of 22 to 1000 V/mm. When the electric field is within this range, low-energy charged particles which have been unobservable by the conventional observation method can be more easily detected in real time.

The fourth aspect of the present invention consists in the charged particle detection material according to any one of the first to third aspects, characterized in that the charged particles are electrons, and a potential difference between the charged particle-emitting part and the charged particle incident part is lower than a voltage V calculated by Paschen's law.

Herein, the term "Paschen's law" refers to an experimental rule regarding a voltage at which discharge occurs (sparking voltage), and is represented by the following Equation.

$$V = \frac{Bpd}{\ln Apd + C} \quad \text{[Equation 1]}$$

(Each of A and B represents a constant shown in the following table 1, p represents a pressure of gas, and d represents a distance between electrodes (a distance between the charged particle-emitting part and the charged particle incident part).)

TABLE 1

| Gas | A [Pa$^{-1}$ · m$^{-1}$] | B [V · Pa$^{-1}$ · m$^{-1}$] | $V_{sm}$ [V] | pd$_{sm}$ [Pa · m] |
|---|---|---|---|---|
| H$_2$ | 3.8 ± 0.8 | 98 ± 20 | 270 ± 54 | 1.53 ± 0.3 |
| He | 2.1 ± 0.4 | 26 ± 6 | 156 ± 32 | 5.3 ± 1.0 |
| N$_2$ | 9.3 ± 1.8 | 257 ± 52 | 250 ± 50 | 0.89 ± 0.18 |
| Ar | 10.2 ± 3.0 | 176 ± 96 | 233 ± 46 | 1.01 ± 0.20 |
| Air | 11.0 ± 2.0 | 274 ± 54 | 330 ± 66 | 0.76 ± 0.16 |

In Table 1, $V_{sm}$ represents a minimum sparking voltage, and pd$_{sm}$ represents a pd value at the minimum sparking voltage. In addition, each constant is not particularly limited as long as it is within the range described in Table 1, but a median value of a range of each constant (e.g. when the gas is air, A=1.1, B=274, $V_{sm}$=330, pd$_{sm}$=0.76) is particularly preferable.

Note that C is a constant decided depending on the type of the gas and the electrode material and can be determined by an experiment. Additionally, in a case of a gas not listed in Table 1, the value of each constant can be determined by fitting the resultant value of an experiment in accordance with the least squares method, or the like.

In the fourth aspect, low-energy electrons can be easily detected in real time at a low voltage range where discharge has not conventionally been accompanied by a luminous phenomenon. Note that the inventor of the present invention succeeded for the first time in the world in detecting discharge resulting from static electricity by means of lights, by using the material (charged particle detection material) on which low energy electrons moved from the charged particle-emitting part to the charged particle incident part to induce light emission even at this voltage range.

As the detection condition in this aspect. e.g. the voltage is preferably 3 kV or more under a condition of an interelectrode distance of 10 to 55 mm in air, preferably 2 to 3 kV under a condition of an interelectrode distance of 10 to 45 mm in air, and preferably 1 to 3 kV air under a condition of an interelectrode distance of 10 to 35 mm in air.

The fifth aspect of the present invention consists in the charged particle detection material according to any one of the first to fourth aspects, characterized in that the total weight ratio of the fluorescent substance, the luminescent substance, the electroluminescent substance, the fractoluminescent substance, the photochromic substance, the afterglow substance, the photostimulated luminescent substance and the mechanoluminescent substance is 20 to 80 wt %.

In the fifth aspect, the charged particle detection material can be easily applied on the surface of the charged particle-emitting part or the charged particle incident part and can emit light with sufficient luminance so as to detect the charged particles can by a general industrial camera or the like, so that the charged particles can be easily detected.

The sixth aspect of the present invention consists in the charged particle detection material according to any one of the second to fifth aspects, characterized in that the non-vacuum state is under a pressure within a range of $10^3$ to $10^5$ Torr.

In the sixth aspect, even under a pressure within the range of $10^{-3}$ to $10^5$ Torr, emission of the charged particles from the charged particle-emitting part or incidence of the charged particles to the charged particle incident part can be easily detected in real time.

The seventh aspect of the present invention consists in the charged particle detection material according to any one of the first to sixth aspects, characterized in that the afterglow substance is a substance represented by $SrAl_2O_4$ which is doped with $Eu^{2+}$ and $Dy^{3+}$, a substance represented by $SrAl_2O_4$ which is doped with $Eu^{2+}$, $Dy^{2+}$ and M (M=monovalent to trivalent metal ions), or a substance represented by $Zn_3(PO_4)$ which is doped with $Mn^{2+}$ and M (M=monovalent to trivalent metal ions).

In the seventh aspect, the charged particle detection material can emit light with higher luminance so that the charged particles can be more easily detected.

The eighth aspect of the present invention consists in the charged particle detection material according to any one of the first to sixth aspects, characterized in that the mechanoluminescent substance is a substance represented by $SrAl_2O_4$ which is doped with $Eu^{2+}$, a substance represented by $SrAl_2O_4$ which is doped with at least one of $Eu^{2+}$, $Ho^{3+}$, $Dy^{2+}$, $M_1$, $M_2$ and $M_3$ ($M_1$, $M_2$, $M_3$=monovalent to trivalent metal ions different from each other), or a substance represented by $CaYAl_3O_7$ which is doped with $Eu^{2+}$.

In the eighth aspect, the charged particle detection material can emit light with higher luminance so that the charged particles can be more easily detected.

The ninth aspect of the present invention consists in a charged particle detection film including the charged particle detection material according to any one of the first to eighth aspects.

Herein, the "charged particle detection film" is not particularly limited as long as it is composed of a material containing at least one of the above-described substances. The charged particle detection film may be prepared by homogenously mixing e.g. an epoxy resin or a urethane resin, a curing agent and a solvent for controlling crosslinking/curing reaction of these resins, the above-described substance, and a dispersant/adjuvant for homogenously dispersing the substance. In addition, the concentration (weight ratio) of the above-described substance contained in the charged particle detection film is not particularly limited, but a range of 20 to 80 wt % is preferable because light emission can be visually confirmed, and a range of 50 to 70 wt % is more preferable because light emission can be visually confirmed more obviously. In addition, the thickness of the charged particle detection film is not particularly limited, but a thickness range of 1 μm to 1 mm is preferable from the viewpoints of light emission intensity and ease of handling, and a thickness range of 10 to 500 μm is more preferable from the viewpoints of light emission intensity and ease of handling.

Note that the charged particle detection film may be directly formed (applied as a solution/cured) on a surface of a measurement object, or alternatively may be formed on the surface of the measurement object by sticking the preformed "charged particle detection film" onto the surface of the measurement object.

In the ninth aspect, the charged particle detection film can be easily formed or stuck without being influenced by the shape of the measurement object. As a result, even if the measurement object has a complex three-dimensional shape such as a curved surface, charged particles entering the surface can be easily detected.

The tenth aspect of the present invention consists in a charged particle detection liquid including the charged particle detection material according to any one of the first to eighth aspects.

Herein, components other than the charged particle detection material constituting the charged particle detection liquid are not particularly limited as long as they can disperse the charged particle detection material, and they may be e.g. water, a transparent/translucent resin, or the like.

In the tenth aspect, the charged particle detection material can be poured (placed) even to surfaces of a measurement object having a complicated shape and a measurement object having a narrow portion or the like incapable of forming a charged particle detection film, so that the charged particles entering the measurement object having such a complicated shape can be easily detected. In addition, the charged particle detection material is three-dimensionally dispersed in the liquid so that the trajectory of the charged particles moving in the liquid can be visualized.

Each of the "fluorescent substance". "luminescent substance", "electroluminescent substance", "fractoluminescent substance", "photochromic substance", "afterglow substance". "photostimulated luminescent substance" and "mechanoluminescent substance" may have not only the property of each substance itself but also the properties of other substances. For example, the "mechanoluminescent substance" may have the property of the "fluorescent substance". In this case, this substance is a "mechanoluminescent substance" and is also a "fluorescent substance".

Also, the charged particle detection material may contain substances other than the above-mentioned substances. Note that the substances other than the above-mentioned substances are not particularly limited.

DESCRIPTION OF EMBODIMENTS

A charged particle detection material according to the present invention detects emission of charged particles from a charged particle-emitting part or incidence of charged particles to a charged particle incident part.

Herein, the charged particle-emitting part and the charged particle incident part are not particularly limited as long as the charged particles can be emitted from or can enter a surface, respectively, when applying an electric field between the charged particle-emitting part and the charged particle incident part by applying voltages to them. Typical examples of substances constituting the charged particle-emitting part and the charged particle incident part include, but are not limited to: a conductor like a metal having a high electric conductivity such as tungsten, stainless steel, gold, silver and copper; a semiconductor such as silicon: and an insulator such as ceramics, polymer and resin. For example, when the charged particles are electrons, the charged particle-emitting part can be exemplified by aluminum or the like, and the charged particle incident part can be exemplified by vinyl chloride or the like.

Embodiments of ad charged particle detection system using a charged particle detection material according to the present invention will be explained below with reference to the accompanying drawings. Note that the present invention is not limited to the following embodiments.

Embodiment 1

A configuration will be explained, in which a charged particle detection film including a charged particle detection material containing at least one of a fluorescent substance, a luminescent substance, an electroluminescent substance, a fractoluminescent substance, a photochromic substance, a afterglow substance, a photostimulated luminescent substance and a mechanoluminescent substance is formed on surfaces of a charged particle-emitting part and a charged particle incident part, and when an electric field is applied between the charged particle-emitting part and the charged particle incident part, charged particles (e.g. $N^+$, $N^-$, electrons, etc.) caused by ionizing a gas around the electrode are emitted from the charged particle-emitting part and enter the charged particle incident part.

Figure 1:
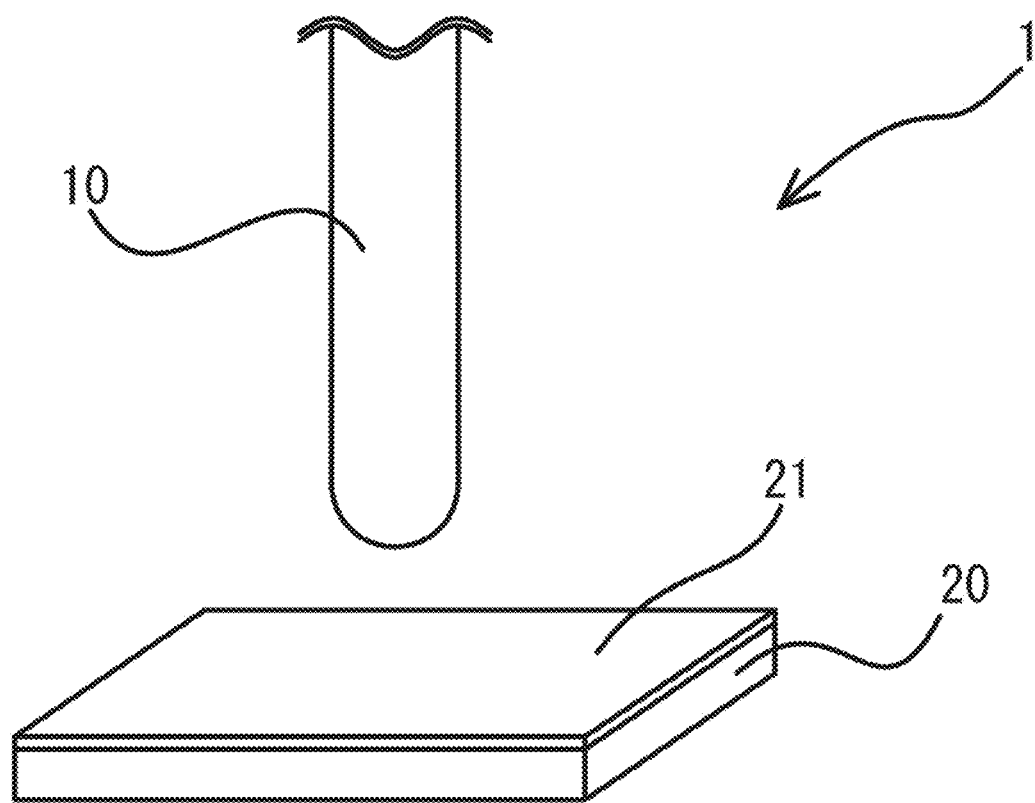
FIG. 1 shows a schematic drawing of a charged particle detection system according to Embodiment 1.

FIG. 1 shows a schematic drawing of a charged particle detection system 1 according to this embodiment. As shown in this figure, the charged particle detection system 1 according to the present embodiment is composed of a cylindrical charged particle-emitting part 10 having a lower end formed in a hemispherical shape, a rectangular plate-shaped charged particle incident part 20 disposed below the cylindrical charged particle-emitting part 10, and DC high-voltage generators (not shown in figure) respectively connected to the cylindrical charged particle-emitting part 10 and the rectangular plate-shaped charged particle incident part 20. Note that the cylindrical charged particle-emitting part 10 and the rectangular plate-shaped charged particle incident part 20 are fixed by jigs not shown in figure. In addition, the shape of the cylindrical charged particle-emitting part 10 is not particularly limited, and its end may be spherical, needle-shaped or planar.

A charged particle detection film 21 including a charged particle detection material containing a substance such as the above-described fluorescent substance is provided on the upper surface of the rectangular plate-shaped charged particle incident part 20 disposed below the cylindrical charged particle-emitting part 10.

Herein, the charged particle detection film 21 provided on the surface of the rectangular plate-shaped charged particle incident part 20 is not particularly limited as long as it includes the charged particle detection material containing at least one of the above-described substances. The charged particle detection film 21 may be prepared by homogeneously mixing e.g. an epoxy resin or an urethane resin, a curing agent and a solvent for controlling crosslinking/curing reaction of these resins, the above-described substances, and a dispersant/adjuvant for homogeneously dispersing the substances, and applying/curing this mixture on the surface of the rectangular plate-shaped charged particle incident part 20. The concentration (weight ratio) of the above-described substances contained in the charged particle detection film 21 is not particularly limited, but a range of 20 to 80 wt % is preferable because light emission can be visually confirmed, and a range of 50 to 70 wt % is more preferable because light emission can be visually confirmed more obviously.

The DC high-voltage generator is not particularly limited as long as it can apply a predetermined electric field (generate a potential difference) between the cylindrical charged particle-emitting part 10 and the rectangular plate-shaped charged particle incident part 20, and a commercial product may be used. The intensity of the electric field between the cylindrical charged particle-emitting part 10 and the rectangular plate-shaped charged particle incident part 20 is also not particularly limited, but a range of 1 to 3000 V/mm is preferable because low-energy charged particles which have been unobservable by the conventional observation method can be easily detected in real time, and a range of 22 to 1000 V/mm is more preferable because the low-energy charged particles can be more easily detected.

Example 1

Stainless steel was used as the cylindrical charged particle-emitting part 10, an aluminum foil was used as the rectangular plate-shaped charged particle incident part 20, and a mixture of a mechanoluminescent substance $SrAl_2O_4$:$Eu^{2+}$ and photocurable acrylic resin (made by MICROJET Corporation) (weight ratio of $SrAl_2O_4$:$Eu^{2+}$ is 70%) was applied and cured to use it as a charged particle detection film 21 (about 100 μm in thickness) formed on the surface of the rectangular plate-shaped charged particle incident part 20. The DC high-voltage generator was operated in air at 1 atm. humidity of 30% and temperature of 10° C. so as to apply an electric field (100 to 800 V/mm) between the cylindrical charged particle-emitting part 10 and the rectangular plate-shaped charged particle incident part 20 (10 mm). The result is shown in FIG. 2.

Figure 2:
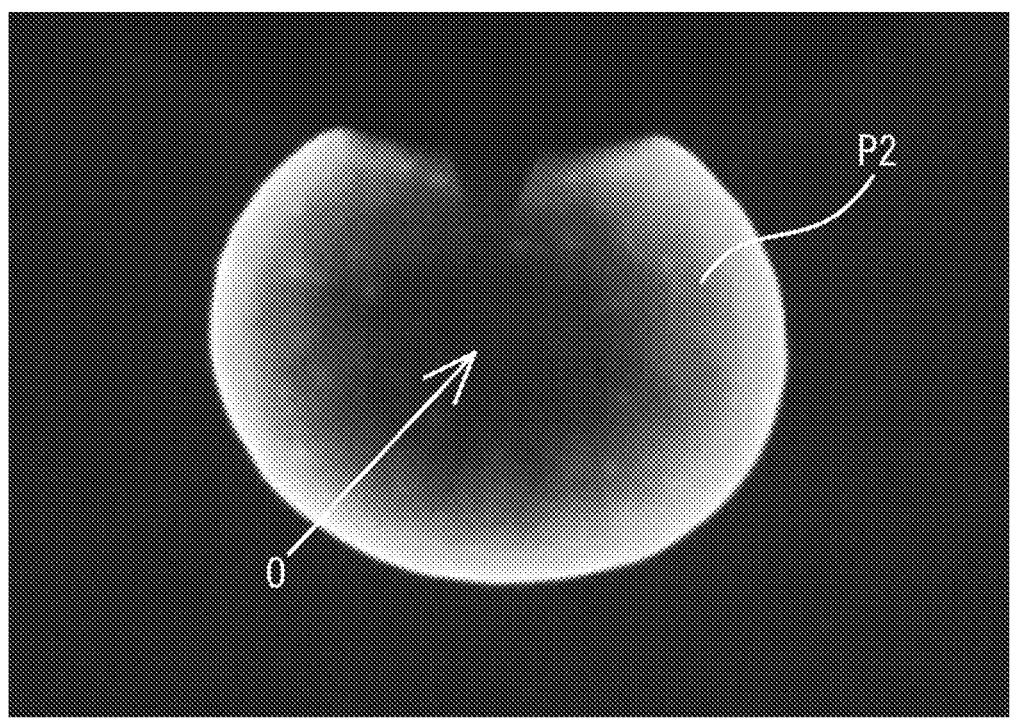
FIG. 2 shows a photograph of a luminescent part P2 formed on a surface of a charged particle incident part in Example 1.

As shown in FIG. 2, when the electric field is applied between the cylindrical charged particle-emitting part 10 and the rectangular plate-shaped charged particle incident part 20, a substantially circular luminescent part P2 with a center O beneath the cylindrical charged particle-emitting part 10 is formed on the upper surface of the rectangular plate-shaped charged particle incident part 20. For the circular luminescent part P2, the center O emits light at first, and when continuing to inject the charged particles into the rectangular plate-shaped charged particle incident part 20, the circular luminescent part P2 spreads outwardly from the center O over time, and the luminance around the center O is decreased. That is, although the center O emits light at first, the circular luminescent part P2 becomes ring-shaped over time, and the diameter of the ring shape seems to increase. In FIG. 2, the luminance is highest at the outermost portion and gradually decreases toward the center O. In addition, a radius of the circular luminescent part P2 is small at first when activating the DC high-voltage generator, but increases over time.

It was confirmed that the same experiment in air at 1 atm 80% humidity and 80° C. resulted in light emission in a similar manner. Furthermore, it was confirmed that the same experiment in a state where the pressure inside the container housing the cylindrical charged particle-emitting part 10 and the rectangular plate-shaped charged particle incident part 20 was reduced to $10^{-3}$ Torr by a rotary pump resulted in light emission in a similar manner.

Figure 3:
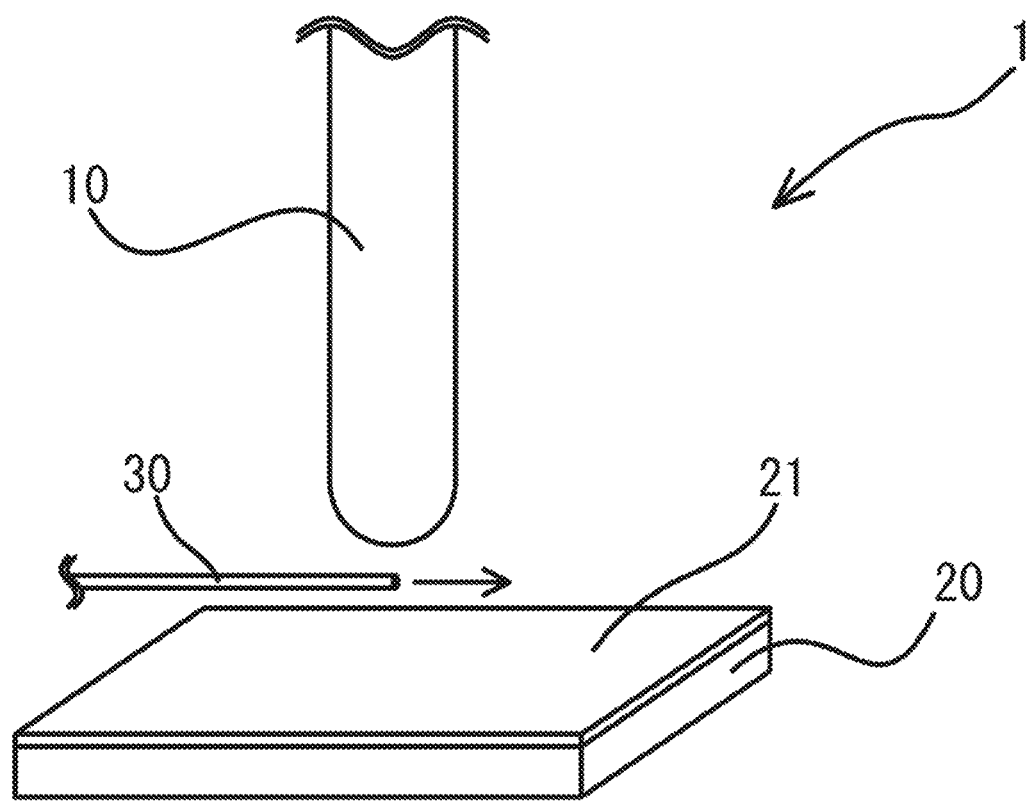
FIG. 3 shows a schematic drawing of the charged particle detection system at the time that a charged member is inserted between a charged particle-emitting part and the charged particle incident part in Example 1.

Next, as shown in FIG. 3, a charged member 30 composed of a rod-shaped aluminum foil in a floating state was inserted between the cylindrical charged particle-emitting part 10 and the rectangular plate-shaped charged particle incident part 20. The result is shown in FIG. 4.

Figure 4:
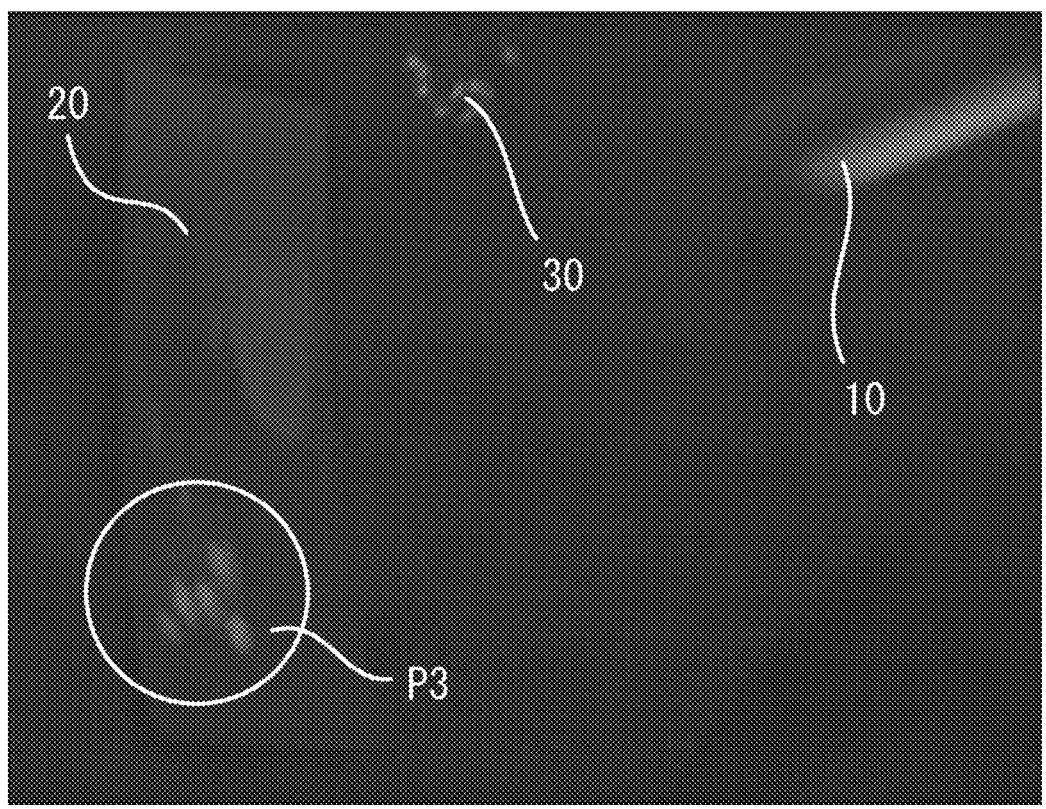
FIG. 4 shows a photograph of a luminescent part P3 before the charged member is inserted between the charged particle-emitting part and the charged particle incident part in Example 1.
Figure 5:
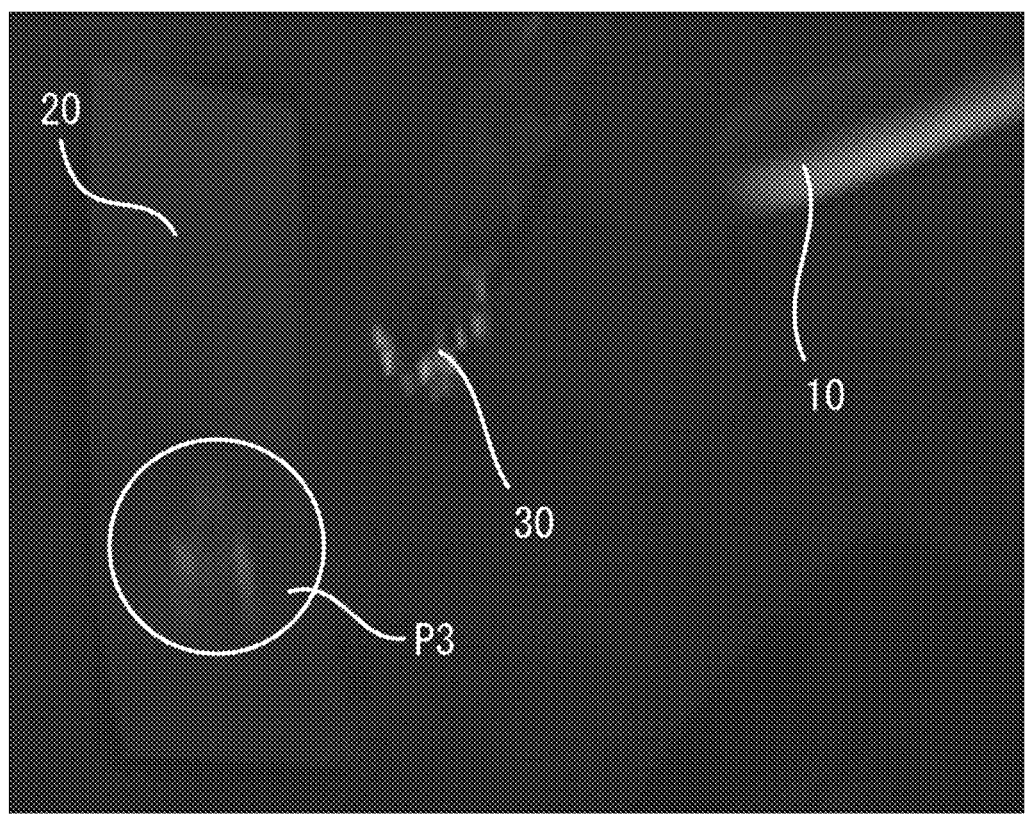
FIG. 5 shows a photograph of the luminescent part P3 at the time that the charged member is inserted between the charged particle-emitting part and the charged particle incident part in Example 1.

It was found that a luminescent part P3 was located under the rod shaped aluminum foil before inserting the charged member 30 as shown in FIG. 4, but the luminescent part P3 moved toward the charged member 30 (upward) after inserting the charged member 30 as shown in FIG. 5. In addition, an ammeter was provided between the cylindrical charged particle-emitting part 10 and the rectangular plate-shaped charged particle incident part 20, a current therebetween was measured at this time, and as a result, it was found that the current flowed from the rectangular plate-shaped charged particle incident part 20 to the cylindrical charged particle-emitting part 10.

Figure 6:
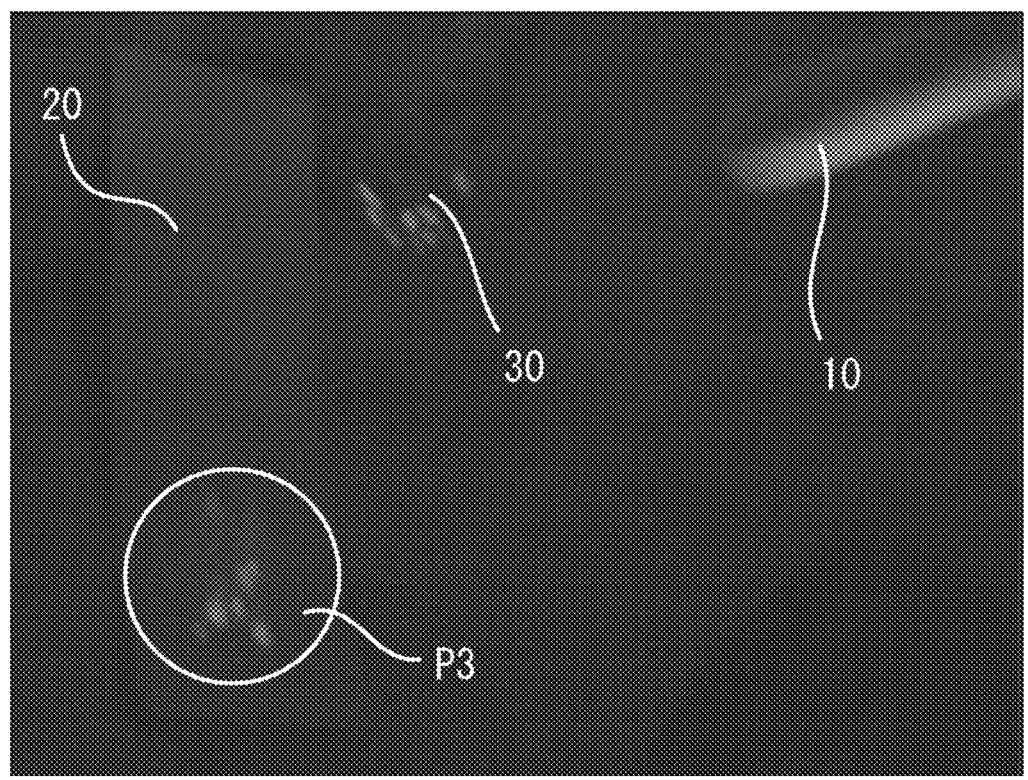
FIG. 6 shows a photograph of the luminescent part P3 at the time that the charged member inserted between the charged particle-emitting part and the charged particle incident part is pulled out in Example 1.

Note that it was found that when the charged member 30 was pulled from between the cylindrical charged particle-emitting part 10 and the rectangular plate-shaped charged particle incident part 20, the luminescent part P3 returned to the position before inserting the charged member 30 as shown in FIG. 6.

From the above, it was found that the negatively-charged particles moved from the cylindrical charged particle-emitting part 10 toward the rectangular plate-shaped charged particle incident part 20. Herein, the movement of the charged particles is considered to include not only a phenomenon that specific charged particles such as N and electrons directly move from the cylindrical charged particle-emitting part 10 to the rectangular plate-shaped charged particle incident part 20, but also a phenomenon that some charged particles continuously push other charged particles like a chain-reaction collision, and as a result, the charged particles seem to move from the cylindrical charged particle-emitting part 10 to the rectangular plate-shaped charged particle incident part 20. Furthermore, it is considered that the movement also includes a phenomenon that the gas molecules around the cylindrical charged particle-emitting part 10 are ionized and move to the rectangular plate-shaped charged particle incident part 20 so that the charged particles seem to move from the cylindrical charged particle-emitting part 10 to the rectangular plate-shaped charged particle incident part 20, is also included.

Figure 7:
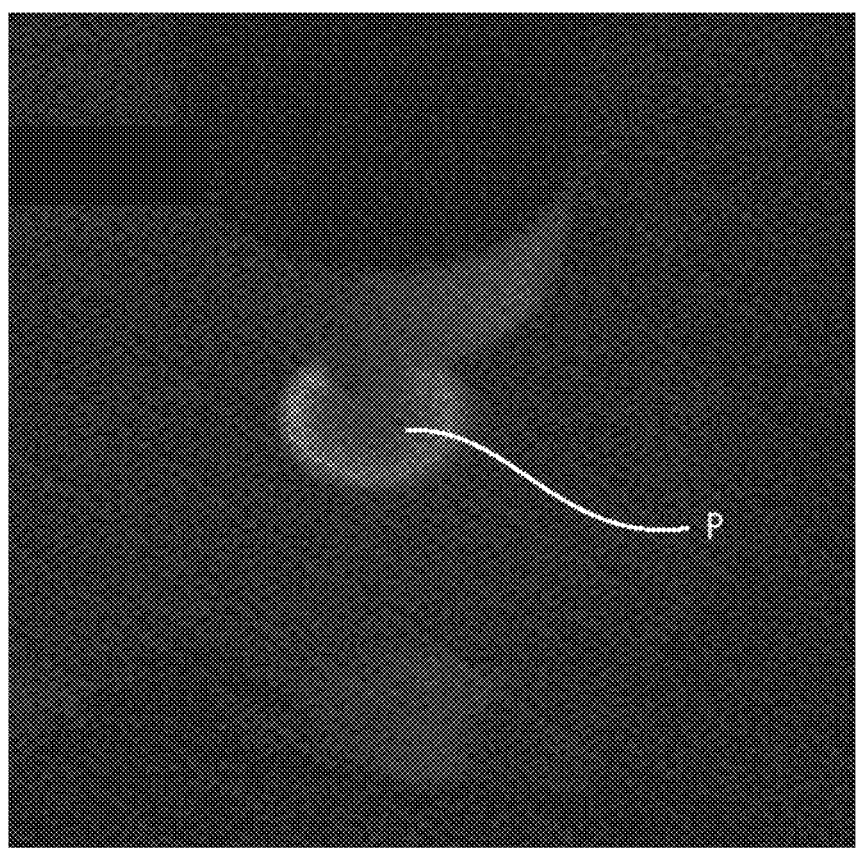
FIG. 7 shows a photograph of a test result when using $SrAl_2O_4:Ho^{3+}, Ce^{3+}$ as the mechanoluminescent substance.
Figure 8:
FIG. 8 shows a photograph of a test result when using $CaYAl_3O_7:Eu^{2+}$ as the mechanoluminescent substance.
Figure 9:
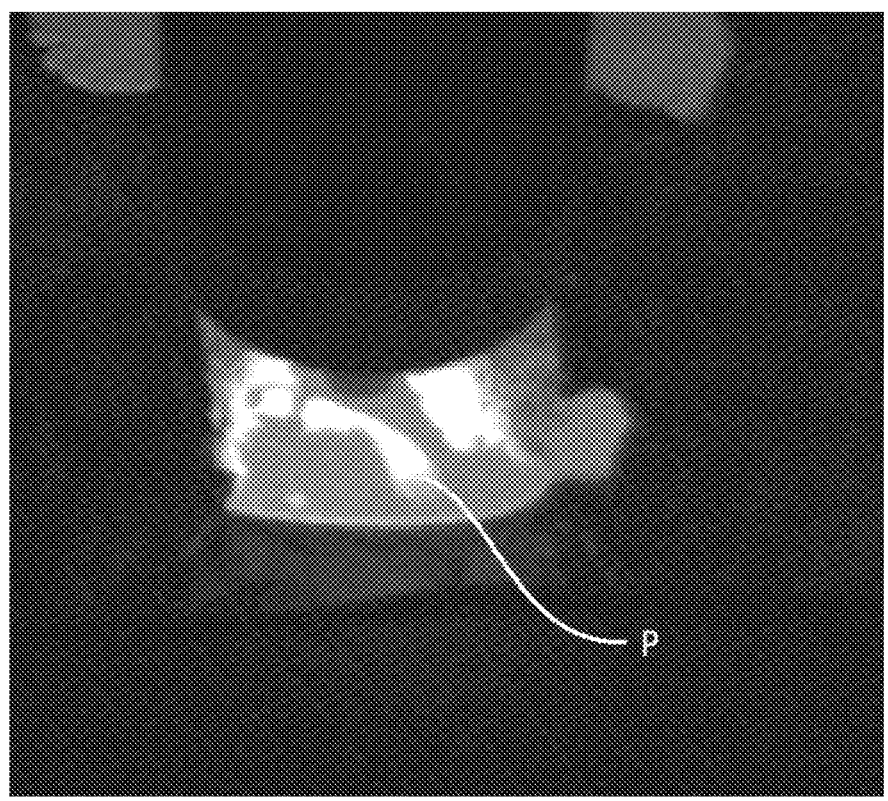
FIG. 9 shows a photograph of a test result when using $SrAl_2O_4:Eu^{2+}, Cr^{3+}, Nd^{3+}$ as the mechanoluminescent substance.

Charged particle detection films 21 respectively containing similar mechanoluminescent substances $SrAl_2O_4:Ho^{3+}, Ce^{3+}$; $CaYAl_3O_7:Eu^{2+}$; or $SrAl_2O_4:Eu^{2+}, Cr^{3+}, Nd^{3+}$ instead of $SrAl_2O_4:Eu^{2+}$ were prepared, and subjected to the same test. The test results are shown in FIGS. 7 to 9. As can be seen from these figures, when the charged particles are made to enter the charged particle detection film 21, the luminescent part P was formed on each charged particle detection film 21. Therefore it was found that the charged particles could be detected also when using the charged particle detection films 21 including these charged particle detection materials.

Figure 10:
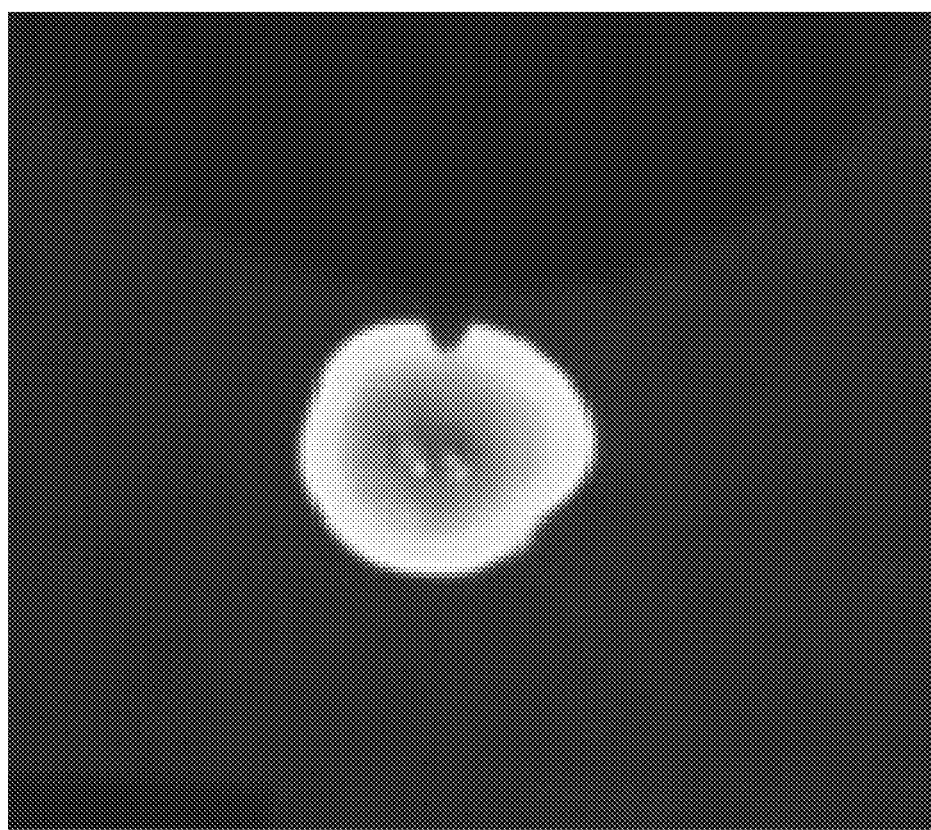
FIG. 10 shows a photograph of a test result when changing the polarity of the electrode in Example 1.

Furthermore, a test result when changing the polarity of the electrode in Example 1 is shown in FIG. 10. As shown in FIG. 10, it was found that the charged particles could be detected even when changing the polarity of the electrode (i.e., even when charged particles with different polarities entered the film).

Example 2

In Example 1, the charged particle detection film including the charged particle detection material was formed on the surface of the charged particle incident part, but the present invention is not limited thereto. In this example, the same charged particle detection film (about 100 μm in thickness) as the charged particle detection film used in Example 1 was formed on a surface of a cylindrical rod made of stainless steel. Then, a human hand was moved while a voltage was applied to the rod so as to apply an electric field between the rod and the human hand. The result is shown in a figure.

Figure 11:
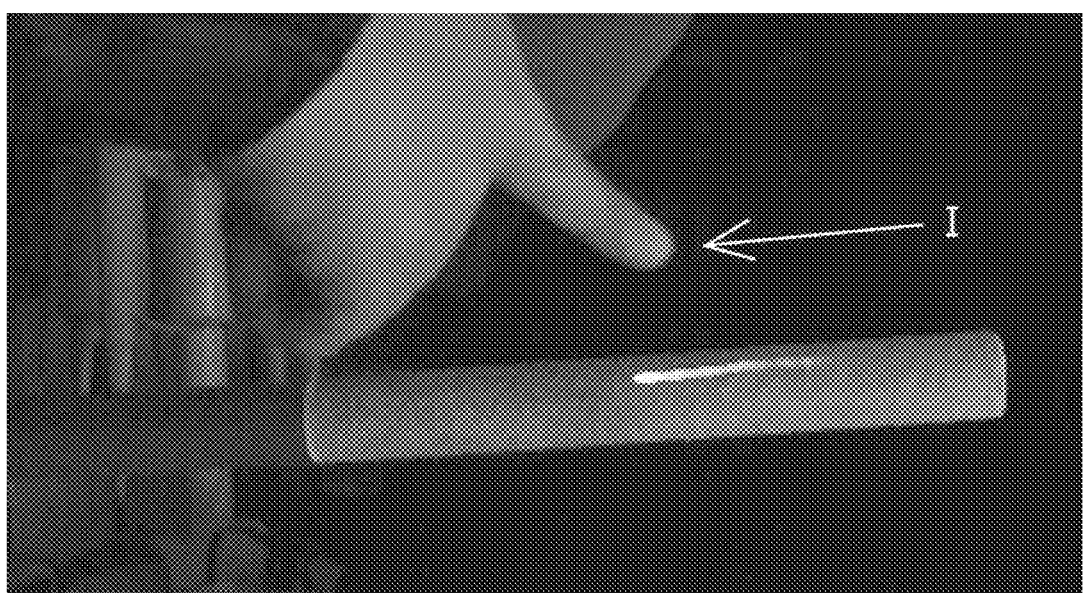
FIG. 11 shows a photograph at the time that a human hand is moved while applying a voltage to a rod on which a charged particle detection film is formed in Example 2.

FIG. 11 shows a photograph at the time that the human hand was moved in a direction I while applying a voltage to the rod on which the charged particle detection film was formed. As shown in FIG. 11, it was found that the luminescent part moved along a moving direction of the human hand.

Herein, since the potential of the human hand was lower than the potential (voltage) applied to the rod, it was found that the charged particles were emitted from the rod (charged particle-emitting part) toward the human hand (charged particle incident part).

Example 3

Examples 1 and 2 were explained using the charged particle detection film containing the mechanoluminescent substance as the charged particle detection material, but the charged particle detection material according to the present invention is not limited thereto. In this example, a charged particle detection film (about 100 μm in thickness) containing $SrAl_2O_4:Eu^{2+}, Dy^{3+}$ as an afterglow substance instead of the mechanoluminescent substance $SrAl_2O_4:Eu^{2+}$ was used. Then, an electric field (100 to 800 V/mm) was applied between the charged particle-emitting part 10 and the charged particle incident part 20 (gap distance: 10 mm) by activating the DC high-voltage generator in the same manner as in Example 1. The result is shown in a figure.

Figure 12:
FIG. 12 shows a photograph of a luminescent part formed on the surface of the charged particle incident part at the time that a voltage is applied on an electrode needle and the charged particles are made to enter the charged particle detection film in Example 3.

As shown in FIG. 12, it was found when an electric field (100 to 800 V/mm) was applied between the charged particle-emitting part and the charged particle incident part, a substantially circular luminescent part with a center beneath the charged particle-emitting part was formed on the surface of the charged particle detection film of the charged particle incident part similarly to Example 1.

As described above, it was found that emission of the charged particles or incidence of the charged particles could be easily detected in real time similarly to Examples 1 and 2 by using the charged particle detection material containing the afterglow substance and the charged particle detection film including the material. In addition, it was found that even charged particles which were generated by a discharge phenomenon caused in an extremely weak electric field (low potential difference, low energy) and had been unobservable by the prior art could be easily detected in real time by using the charged particle detection material according to the present embodiment.

Example 4

In this example, a charged particle detection film (about 50 μm in thickness) containing $Y_2O_2S:Tb^{3+}$ as a fluorescent substance instead of the mechanoluminescent substance $SrAl_2O_4:Eu^{2+}$ in Example 1 was used. Then, a voltage (7 kV) was applied between the charged particle-emitting part and the charged particle incident part (gap distance: 10 mm) by activating the DC high-voltage generator in the same manner as in Example 1. The result is shown in FIG. 13.

Figure 13:
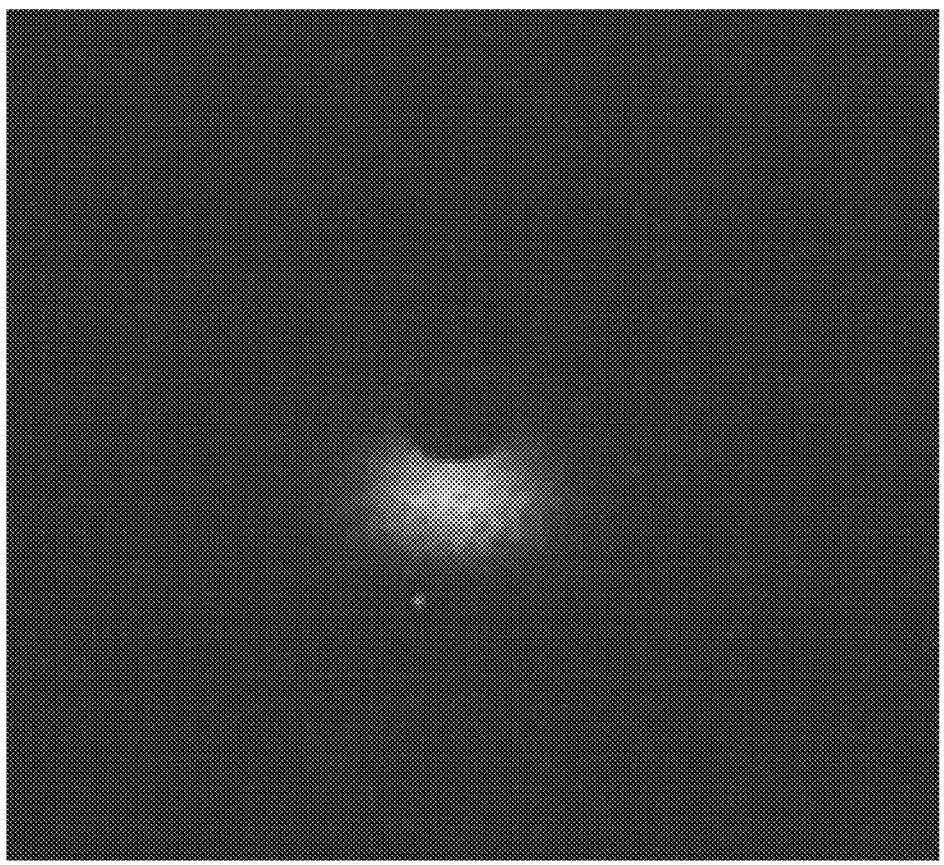
FIG. 13 shows a photograph of the luminescent part formed on the surface of the charged particle incident part at the time that a voltage is applied to the electrode needle and the charged particles are made to enter the charged particle detection film in Example 4.

As shown in FIG. 13, it was found when a voltage (7 kV) was applied between the charged particle-emitting part and the charged particle incident part (gap distance: 10 mm), a substantially circular luminescent part with a center beneath the charged particle-emitting part was formed on the surface of the charged particle detection film of the charged particle incident part similarly to Example 1.

As described above, it was found that emission of the charged particles or incidence of the charged particles could be easily detected in real time similarly to above-described Example 1 by using the charged particle detection material containing the fluorescent substance and the charged particle detection film including the material. In addition, it was found that even charged particles which were generated by a discharge phenomenon caused in an extremely weak electric field (low potential difference, low energy) and had been unobservable by the prior art could be easily detected in real time by using the charged particle detection material according to the present embodiment.

Example 5

In this example, a charged particle detection film (about 50 μm in thickness) containing methyl salicylate as a fractoluminescent substance instead of the mechanoluminescent substance $SrAl_2O_4:Eu^{2+}$ in Example 1 was used. Then, the result of a test under similar conditions to those in Example 1 is shown in FIG. 14.

Figure 14:
FIG. 14 shows a photograph of the luminescent part formed on the surface of the charged particle incident part at the time that a voltage is applied to the electrode needle and the charged particles are made to enter the charged particle detection film in Example 5.

As shown in FIG. 14, it was found that a luminescent part was formed on the surface of the charged particle detection film of the charged particle incident part. From the above, it was found that the same effect as that of above-described Example could be obtained by using the charged particle detection material containing the fractoluminescent substance and the charged particle detection film including the material.

Example 6

In this example, a fractoluminescent substance $Eu(TTA)_3phen$ ([1,10-phenanthroline) tris [4,4,4-trifluoro-1-(2-thienyl)-1,3-butanedionato] europium(III)]) was used as a charged particle detection material instead of the mechanoluminescent substance $SrAl_2O_4:Eu^{2+}$ in Example 1. Then, the result of a test under similar conditions to those in Example 1 is shown in FIG. 15.

Figure 15:
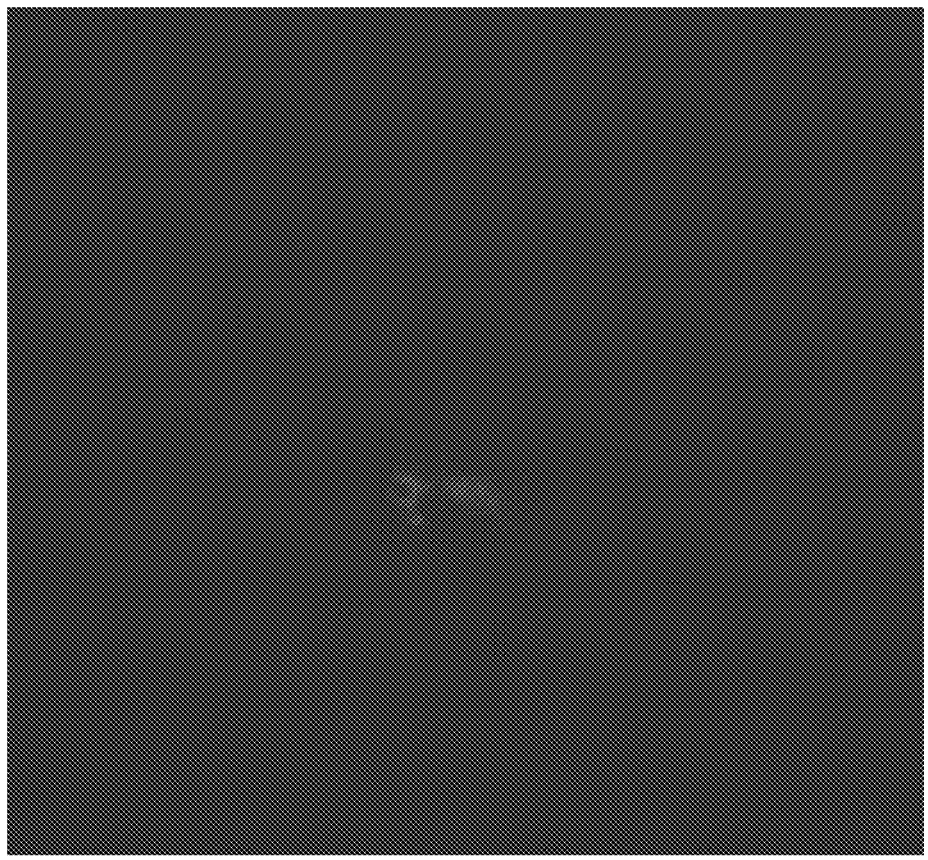
FIG. 15 shows a photograph of the luminescent part formed on the surface of the charged particle incident part at the time that a voltage is applied to the electrode needle and the charged particles are made to enter the charged particle detection film in Example 6.

As shown in FIG. 15, it was found that a luminescent part was formed on the surface of the charged particle detection film of the charged particle incident part. From the above, it was found that the same effect as that of above-described Example could be obtained by using the charged particle detection material containing the fractoluminescent substance and the charged particle detection film including the material similarly to Example 5.

Example 7

In this example, a charged particle detection films (about 50 μm in thickness; weight ratio of the afterglow substance: 70%) respectively containing $SrAl_2O_4:Eu^{2+}$, $Dy^{3+}$ and $β-Zn_3(PO4)_2:Mn^{2+}$, $Ga^{3+}$ as the fluorescent substances instead of the mechanoluminescent substance $SrAl_2O_4:Eu^{2+}$ in Example 1 was used. Then, a voltage (10 kV) was applied between the charged particle-emitting part and the charged particle incident part (gap distance: 10 mm). The result is shown in FIG. 16 ($SrAl_2O_4:Eu^{2+}$, $Dy^{3+}$) and FIG. 17 ($β-Zn_3(PO4)_2:Mn^{2+}$, $Ga^{3+}$).

Figure 16:
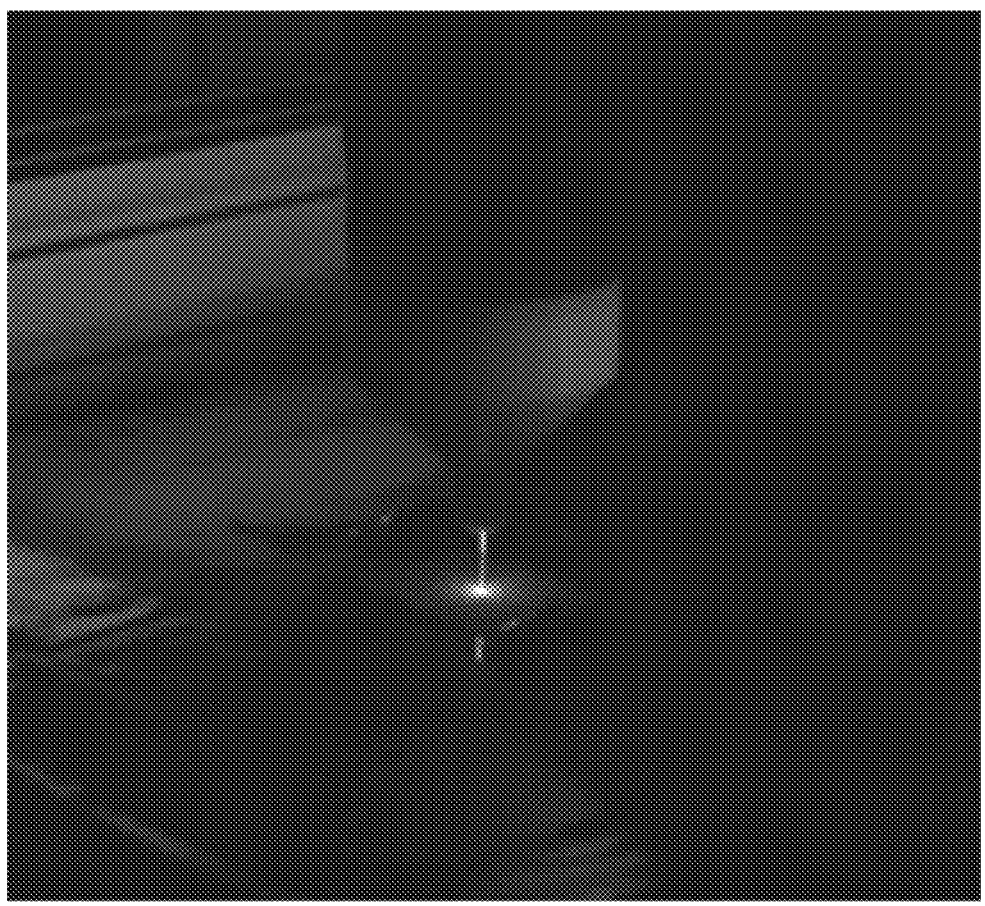
FIG. 16 shows a photograph of the luminescent part formed on the surface of the charged particle incident part at the time that a voltage is applied to the electrode needle and the charged particles are made to enter the charged particle detection film in Example 7 ($SrAl_2O_4:Eu^{2+}, Dy^{3+}$).
Figure 17:
FIG. 17 shows a photograph of the luminescent part formed on the surface of the charged particle incident part at the time that a voltage is applied to the electrode needle and the charged particles are made to enter the charged particle detection film in Example 7 ($\beta$-$Zn_3(PO_4)_2:Mn^{2+}, Ga^{3+}$).

As shown in FIGS. 16 and 17, it was found that a luminescent part was formed on the surface of the charged particle detection film of the charged particle incident part. From the above, it was found that the same effect as that of above-described Example could be obtained by using the charged particle detection film including the charged particle detection material containing the afterglow substance.

Embodiment 2

Although Embodiment 1 was intended to detect the charged particles by forming the charged particle detection film including the charged particle detection material on the surface of the charged particle-emitting part 10 or the charged particle incident part 20, the present invention is not limited to this embodiment.

For example, the charged particle detection material can be configured using a transparent/translucent material like glass or acrylic resin containing at least one of a fluorescent substance, a luminescent substance, an electroluminescent substance, a fractoluminescent substance, a photochromic substance, an afterglow substance, a photostimulated luminescent substance and a mechanoluminescent substance.

When the charged particles are made to enter the charged particle detection material, the surface or the inside of the glass or the like emits light, and it is also possible to detect the depth of incidence of the charged particles inside of the glass or the like.

Embodiment 3

Although the above-described embodiment was intended to detect the charged particle by forming the charged particle detection film including the charged particle detection material containing the mechanoluminescent substance and the like, the present invention is not limited to this embodiment. For example, a mechanoluminescent substance (powder) may be used as it is as the charged particle detection material.

Figure 18:
FIG. 18 shows a photograph at the time that the charged particles are detected using a $SrAl_2O_4:Eu^{2+}$ powder.

FIG. 18 shows a photograph at the time that charged particles were detected using a mechanoluminescent substance (powder) $SrAl_2O_4:Eu^{2+}$ powder as a charged particle detection material. It was found that the charged particles could be detected in the same manner as the above-described embodiment even when using the charged particle detection material in such a form (powder).

In addition, a luminescent sheet prepared using the charged particle detection material may be used instead of the mechanoluminescent substance (powder), in which a fine particle made of the mechanoluminescent substance and the like is dispersed.

Figure 19:
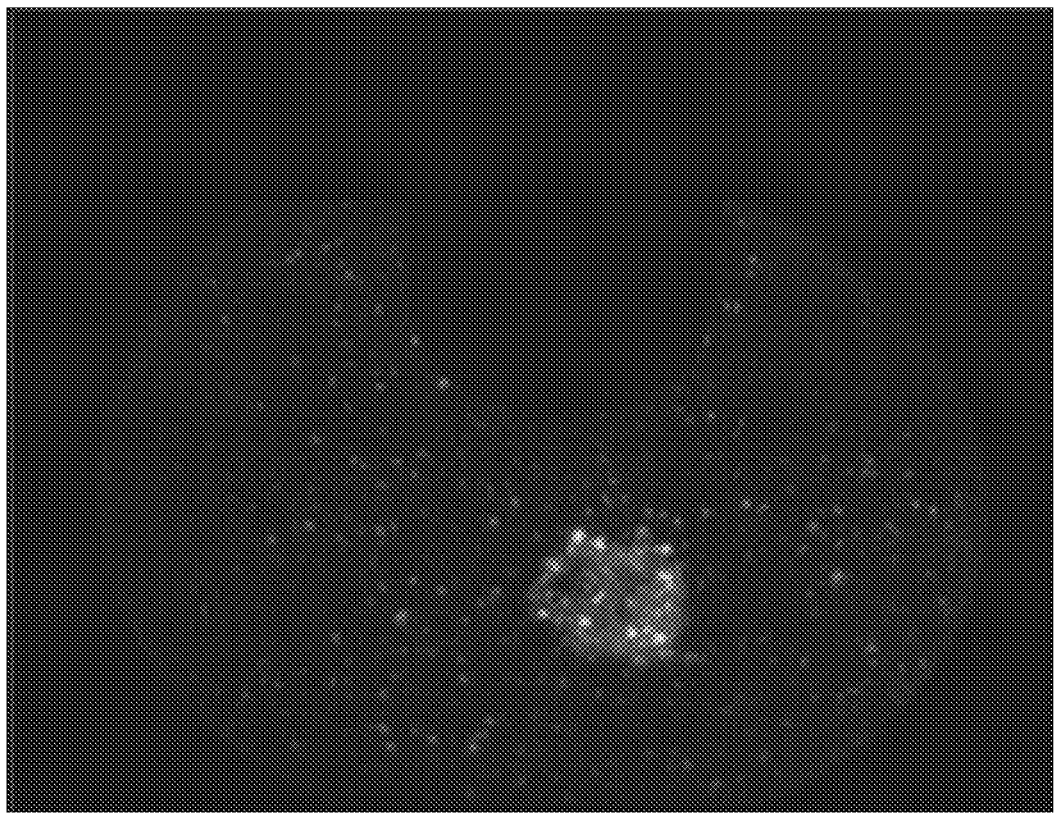
FIG. 19 shows a photograph at the time that the charged particles are detected using a luminescent sheet in which a $SrAl_2O_4:Eu^{2+}$ powder is dispersed.

FIG. 19 shows a photograph at the time that charged particles were detected using a luminescent sheet prepared by curing a charged particle detection material in which a mechanoluminescent substance $SrAl_2O_4:Eu^{2+}$ was dispersed in a photocurable acrylic resin (made by MICROJET Corporation). It was found that the charged particles could be detected in the same manner as the above-described embodiment even when using the charged particle detection material in such a form.

Embodiment 4

Figure 20:
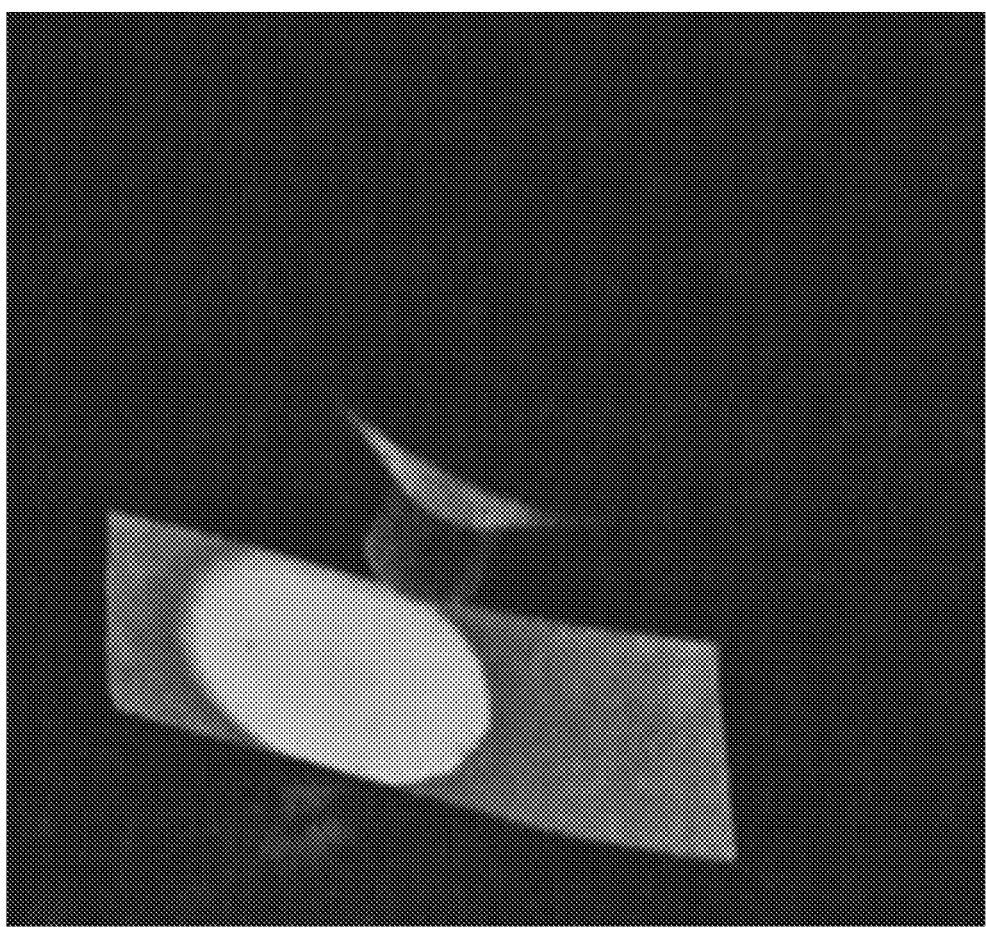
FIG. 20 shows a photograph at the time that the charged particle detection film containing $SrAl_2O_4:Eu^{2+}$ is formed on an aluminum foil, to which the charged particles are made to enter.

In the above-described embodiment, the charged particle detection film including the charged particle detection material was formed on the charged particle-emitting part or the charged particle incident part having a certain thickness, but the present invention is not limited to this embodiment. For example, the same charged particle detection film as used in Example 1 may be formed on an aluminum foil. FIG. 20 shows a photograph at the time that a charged particle detection film composed of a photocurable acrylic resin (made by MICROJET Corporation) in which a charged particle detection material ($SrAl_2O_4:Eu^{2+}$ (made by Sakai Chemical Industry Co., Ltd.)) was dispersed was formed on an aluminum foil, to which charged particles were made to enter. As shown in FIG. 20, it was found that charged particles could be detected in the same manner as the above-described embodiment even when a charged particle detection film made of a charged particle detection material was formed on a thin film.

Figure 21:
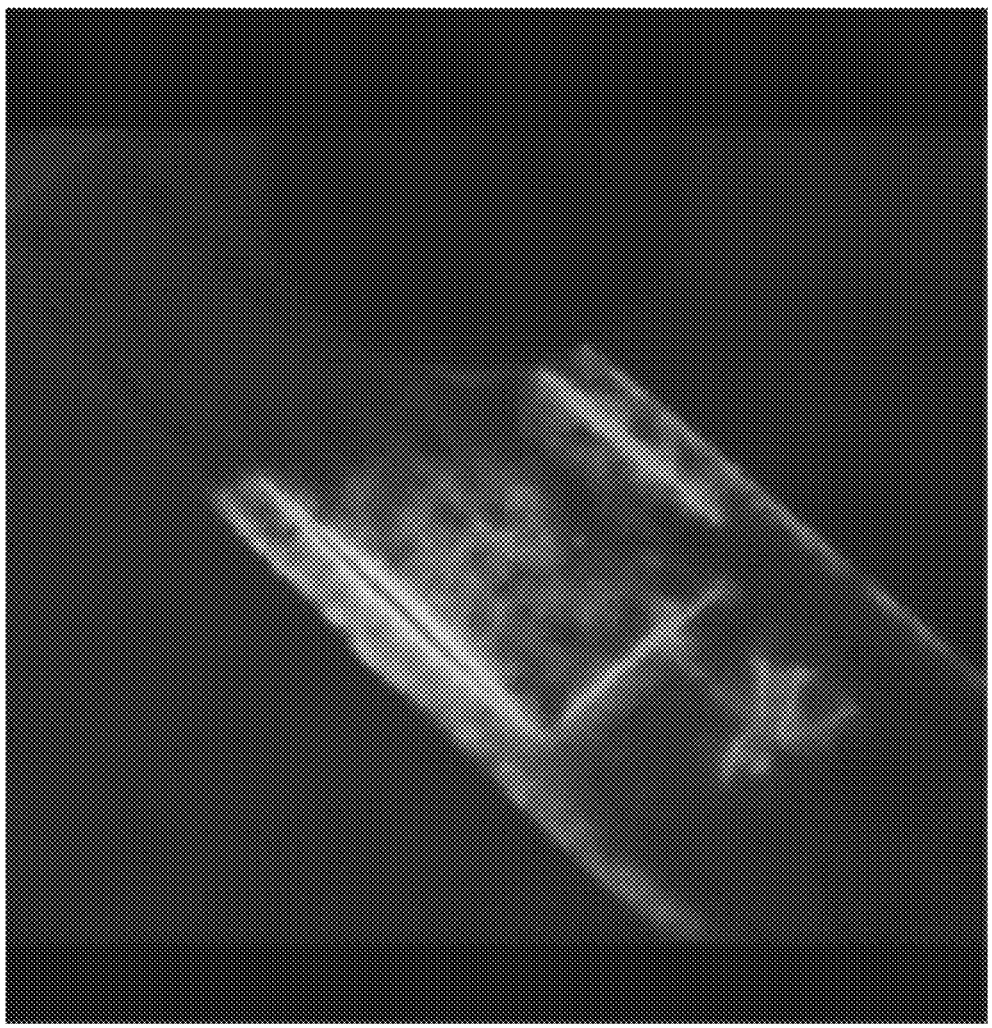
FIG. 21 shows a photograph at the time that the charged particles are made to enter a paper nonwoven fabric in which the charged particle detection material is dispersed.

In addition, the charged particle detection material may be dispersed in e.g. a nonwoven fabric or the like. FIG. 21 shows a photograph at the time that the charged particle detection material was dispersed in and made to adhere to a paper nonwoven fabric, to which the charged particles were made to enter. As shown in FIG. 21, it was found that charged particles could be detected in the same manner as the above-described embodiment even when using a nonwoven fabric or the like in which the charged particle detection material was dispersed.

Embodiment 5

Although the above-described embodiment was intended to detect the charged particles using the charged particle detection film or the charged particle detection material, the present invention is not limited to this embodiment. For example, the charged particles may be detected by using a charged particle detection liquid prepared by dispersing a charged particle detection material in a liquid.

Charged particles entering a measurement object having a complicated shape can be easily visualized by using the charged particle detection liquid. In addition, the charged particle detection material is three-dimensionally dispersed in the charged particle detection liquid so that the trajectory of the charged particles moving in the liquid can be visualized.

Example 8

Figure 22:
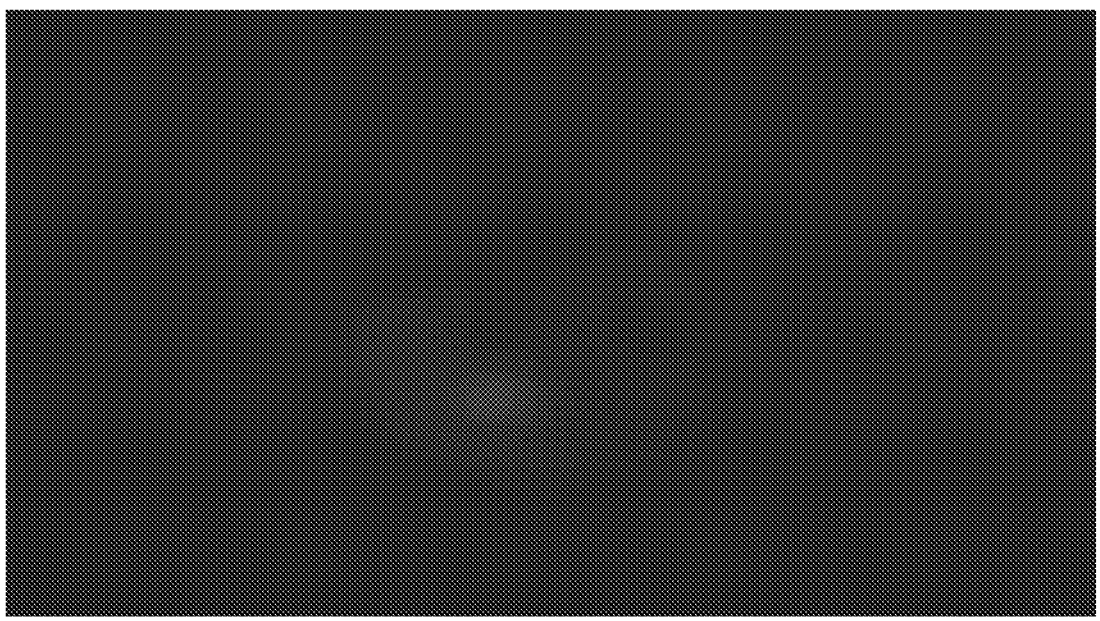
FIG. 22 shows a photograph at the time that the charged particles are made to enter a liquid mixture of $SrAl_2O_4:Eu^{2+}$ and photocurable acryl.

A charged particle detection liquid was prepared, in which a mechanoluminescent substance $SrAl_2O_4:Eu^{2+}$ (made by Sakai Chemical Industry Co., Ltd.) was dispersed in a transparent photocurable acrylic resin (VisiJet CR-CL, made by 3D Systems Corporation) (weight ratio of $SrAl_2O_4:Eu^{2+}$: 70%). Then this charged particle detection liquid was dropped onto the stainless steel plate to form a puddle, to which the charged particles were made to enter from above in the same manner as in Example 1. The result is shown in FIG. 22. At this time, a rod-shaped member was brought into contact with the surface of the charged particle detection liquid for confirming that the photocurable acrylic resin was not cured, and the charged particles were made to enter the liquid thereafter.

As a result, as shown in FIG. 22, it was found that the inside of the charged particle detection liquid emitted light. From this, it was found that the charged particle detection liquid could detect charged particles similarly to the charged particle detection film.

Figure 23:
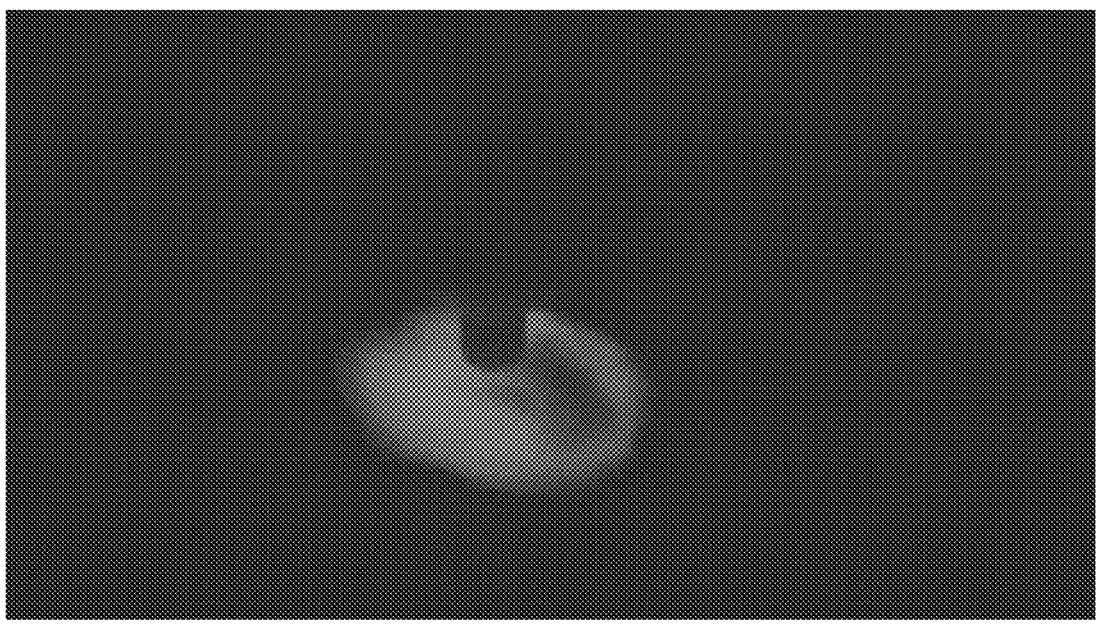
FIG. 23 shows a photograph at the time that a surface of the liquid mixture of $SrAl_2O_4:Eu^{2+}$ and photocurable acryl is cured, and then the charged particles are made to enter the surface.

Next, this liquid mixture was irradiated with ultraviolet ray at 365 nm (0.7 mW/cm$^2$) for 10 minutes to cure only the surface of the charged particle detection liquid and then the charged particles were made to enter the surface similarly to the above. The result is shown in FIG. 23. As shown in FIG. 23, it was found that the cured portion (surface) emitted stronger light compared to before curing.

Other Embodiments

If the charged particle detection material can be three-dimensionally dispersed in a gas such as air similarly to the above-described charged particle detection liquid, the trajectory of the charged particles moving in the gas can be detected.

It should be noted that this application claims priority based on Japanese Patent Application No. 2016-149215 filed on Jul. 29, 2016, and the content of this application is incorporated herein as a reference.

REFERENCE NUMERALS 1 charged particle detection system
10 charged particle-emitting part
20 charged particle incident part
21 charged particle detection film
30 charged member
P, P2, P3 luminescent part

The invention claimed is:

1. A charged particle detection material for detecting charged particles with luminescence, comprising at least one of:
an electroluminescent substance, a fractoluminescent substance, a photochromic substance, an afterglow substance, and
a photostimulated luminescent substance; and phosphorescent luminescent materials selected from the group consisting of iridium complexes and platinum complexes, which emit light by X-rays, ultraviolet rays, or visible light, luminol, rofin, lucigenin, oxalate, photosensitive luminescent dye, and bioluminescent substances,
wherein a total weight ratio of:
the electroluminescent substance, the fractoluminescent substance, the photochromic substance, the afterglow substance, and the photostimulated luminescent substance, and
the phosphorescent luminescent materials selected from the group consisting of iridium complexes and platinum complexes, which emit light by X-rays, ultraviolet rays, or visible light, luminol, rofin, lucigenin, oxalate, the photosensitive luminescent dye, and the bioluminescent substances is 20 to 80 wt %.

2. The charged particle detection material according to claim 1, wherein the afterglow substance is a substance represented by $SrAl_2O_4$ which is doped with $Eu^{2+}$ and $Dy^{3+}$, a substance represented by $SrAl_2O_4$ which is doped with $Eu^{2+}$, $Dy^{2+}$, and M (M=monovalent to trivalent metal ions), or a substance represented by $Zn_3(PO_4)_2$ which is doped with $Mn^{2+}$ and M (M=monovalent to trivalent metal ions).

3. The charged particle detection material for detecting charged particles with luminescence according to claim 1, further comprising:
at least a mechanoluminescent substance.

4. The charged particle detection material according to claim 3, wherein the mechanoluminescent substance is a substance represented by $SrAl_2O_4$ which is doped with $Eu^{2+}$, a substance represented by $SrAl_2O_4$ which is doped with at least one of $Eu^{2+}$, $Ho^{3+}$, $Dy^{2+}$, $M_1$, $M_2$, and $M_3$ ($M_1$, $M_2$, $M_3$=monovalent to trivalent metal ions different from each other), or a substance represented by $CaYAl_3O_7$ which is doped with $Eu^{2+}$.

5. A charged particle detection system for detecting charged particles, comprising: a charged particle-emitting part; a charged particle incident part, and a charged particle detection material according to claim 1, wherein the charged particle detection material is between the charged particle emitting part and the charged particle incident part, and wherein an electric field therebetween is within a range of 1 to 3000 V/mm in air.

6. The charged particle detection system according to claim 5, wherein the afterglow substance is a substance represented by $SrAl_2O_4$ which is doped with Eu2+ and Dy3+, a substance represented by $SrAl_2O_4$ which is doped with $Eu^2+$, $Dy^2+$, and M (M=monovalent to trivalent metal ions), or a substance represented by $Zn_3(PO_4)_2$ which is doped with Mn2+ and M (M=monovalent to trivalent metal ions).

7. A detection film including a charged particle detection film and a charged particle detection material according to claim 1.

8. A detection film including a charged particle detection film and a charged particle detection material according to claim 3.

9. A detection liquid including a charged particle detection liquid and a charged particle detection material according to claim 1.

10. A detection liquid including a charged particle detection liquid and a charged particle detection material according to claim 3.

11. A charged particle detection system for detecting charged particles under air pressure, comprising:
a charged particle-emitting part emitting charged particles;
a charged particle detection material containing at least one of $SrAl_2O_4:E^{2+}$, $SrAl_2O_4:Ho^{3+}$, $Ce^{3+}$, $CaYAl_3O_7$: $Eu^{2+}$, $SrAl_2O_4:Eu^{2+}$, $Cr^{3+}$, $Nd^{3+}$, $SrAl_2O_4:Eu^{2+}$, $Dy^{3+}$, methyl salicylate, and Eu(TTA)3phen; and
a charged particle incident part, wherein between the charged particle-emitting part and the charged particle incident part is an electric field or a potential difference, the electric field between the charged particle-emitting part and the charged particle incident part being within a range of 1 to 3000 V/mm in air.

12. The charged particle detection system according to claim 11,
wherein the charged particles comprise electrons, and
wherein the potential difference between the charged particle-emitting part and the charged particle incident part is lower than a voltage V calculated by Paschen's law.

13. The charged particle detection system according to claim 11, wherein an air pressure is between the charged particle-emitting part and the charged particle incident part, and is in a range of $10^{-3}$ to $10^5$ Torr.

14. The charged particle detection system according to claim 11, wherein the charged particle detection material comprises a charged particle detection film.

15. The charged particle detection system according to claim 11, wherein the charged particle detection material comprises a charged particle detection liquid.

\* \* \* \* \*